United States Patent
Kuwabara et al.

(10) Patent No.: US 8,122,099 B2
(45) Date of Patent: Feb. 21, 2012

(54) IMAGE FORMING DEVICE THAT PREPARES AND TRANSMITS FORMATTED ORDER DATA TO WEB SERVER

(75) Inventors: Satoru Kuwabara, Ohgaki (JP); Yuji Sato, Nagoya (JP); Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1680 days.

(21) Appl. No.: 10/390,703

(22) Filed: Mar. 19, 2003

(65) Prior Publication Data

US 2003/0236713 A1    Dec. 25, 2003

(30) Foreign Application Priority Data

Mar. 28, 2002   (JP) ................ P2002-091481

(51) Int. Cl.
*G06F 15/16* (2006.01)
(52) U.S. Cl. ................... 709/218; 709/206
(58) Field of Classification Search ............ 709/218, 709/206, 230, 203
See application file for complete search history.

(56) References Cited

U.S. PATENT DOCUMENTS

| | | | | |
|---|---|---|---|---|
| 4,893,333 A | * | 1/1990 | Baran et al. | 379/100.11 |
| 5,671,067 A | * | 9/1997 | Negishi et al. | 358/403 |
| 5,727,048 A | * | 3/1998 | Hiroshima et al. | 379/93.12 |
| 5,848,426 A | * | 12/1998 | Wang et al. | 715/210 |
| 5,873,077 A | * | 2/1999 | Kanoh et al. | 707/3 |
| 5,943,137 A | * | 8/1999 | Larson et al. | 358/403 |
| 5,991,739 A | * | 11/1999 | Cupps et al. | 705/26 |
| 6,348,970 B1 | * | 2/2002 | Marx | 358/1.15 |
| 6,614,551 B1 | * | 9/2003 | Peek | 358/1.15 |
| 6,657,743 B1 | | 12/2003 | Otsuka et al. | |
| 6,775,026 B1 | | 8/2004 | Kato | |
| 2001/0004734 A1 | * | 6/2001 | Kudoh et al. | 705/26 |

FOREIGN PATENT DOCUMENTS

| | | |
|---|---|---|
| JP | A 9-259189 | 10/1997 |
| JP | A 10-243156 | 9/1998 |
| JP | A 11-161585 | 6/1999 |
| JP | A 11-234451 | 8/1999 |
| JP | A 11-272711 | 10/1999 |
| JP | A 2000-29954 | 1/2000 |
| JP | A 2000-270148 | 9/2000 |
| JP | A 2001-101113 | 4/2001 |

* cited by examiner

*Primary Examiner* — Douglas Blair
*Assistant Examiner* — Bradford F Fritz
(74) *Attorney, Agent, or Firm* — Oliff & Berridge, PLC

(57) ABSTRACT

When a user inputs a URL character string indicating data for an order document, the CPU receives data for the order document indicated by the URL and reading method data from the web server at the URL destination and prints the order document on a recording unit. The user then fills in circles on the order document to indicate desired content and feeds the order document into the manual-feed paper tray on the facsimile device. At this time, the facsimile device reads a user number and data regarding printing details and scrapbook entry details and transmits order data described as a URL to the web server.

11 Claims, 21 Drawing Sheets

FIG.4(A)

RAM 115

| | |
|---|---|
| WORK MEMORY | 115A |
| TRANSMISSION RECEPTION DATA STORAGE UNIT | 115B |
| URL DATA STORAGE UNIT | 115C |
| TRANSFER DESTINATION DATA STORAGE UNIT | 115D |
| ACCESS PROHIBITED DATABASE | 115E |
| KEYWORD DATABASE | 115F |
| HISTORY DATA STORAGE UNIT | 115G |
| LOG STORAGE UNIT | 115H |
| RECORD/DISPLAY SETTING STORAGE UNIT | 115I |

| URL | MEMO | MONTHLY (DATE) | WEEKLY (DAY) | DAILY (TIME) |
|---|---|---|---|---|
| http://www.**.co.jp/ | XX COMPANY | 15 | - | - |
| http://www.**.co.jp/subdir/ | XX SHOP | - | THURS. | - |
| http://www.**.ne.jp/abc.htm | XX NEWSPAPER | - | - | 10:00 |
| http://www.**.go.jp/ | XX OFFICE | - | - | - |
| http://www.**.com/top.html | **** | | | |

SCHEDULER SETTINGS

| SPACIFICATION | RECORD SETTING | DISPLAY SETTING |
|---|---|---|
| IMAGE OUTPUT | ON | OFF |
| RESOLUTION | 600 dpi | 96 dpi |
| IMAGE SIZE | ----- | ----- |

FIG.5(B)

| OPERATING MODE \ FUNCTION | PRINT | SAVE | PRINTER TRANSFER | PC TRANSFER | MONOCHROME PRINT | QUIET PRINT | LOG SAVE | ERROR DISPLAY |
|---|---|---|---|---|---|---|---|---|
| NORMAL | 1 | 0 | 0 | 0 | 0 | 0 | 1 | 0 |
| URL ACCESS NOT AUTHORIZED | 0 | 0 | 0 | 0 | 0 | * | 1 | * |
| CANCEL PRINT | 0 | 1 | 0 | 0 | 0 | * | 1 | * |
| PASSWORD ERROR | 0 | 0 | 0 | 1 | 0 | * | 1 | * |
| KEYWORD ERROR | 0 | 0 | 0 | 1 | 0 | * | 1 | * |
| SAME CONTENT DETECTED | 0 | * | * | 0 | * | * | 1 | * |
| NIGHTTIME PRINT | * | * | * | 1 | * | 1 | * | * |
| ANSWERING MACHINE | 0 | * | 1 | * | * | 0 | * | 0 |
| LARGE VOLUME MONOCHROME PRINTING | 0 | * | * | * | 0 | 0 | 1 | 1 |
| OUT-OF-PAPER ERROR | 0 | * | * | * | * | * | 1 | 1 |
| OUT-OF-TONER ERROR | 0 | * | * | * | * | * | 1 | 2 |

113B (1 OR GREATER: ON, 0: OFF)
(MONOCHROME PRINT — 1: BLACK, 2: CYAN, 4: MAGENTA)

FIG.10

| READING METHOD | DESCRIPTION |
|---|---|
| 1) name = user<br>position = (x1, y1)<br>method = userid.prog | 1) VARIABLE NAME = user<br>COORDINATE POSITION = (x1, y1)<br>PROGRAM = userid.prog BY WHICH PROCESS IS PERFORMED |
| 2) name = req_detail<br>position = (x2, y2)<br>method = bin_bit<br>arg = P2, 5 | 2) VARIABLE NAME = req_detail<br>COORDINATE POSITION = (Left Offset, Top Offset)<br>PROGRAM = BINARY BIT ARRAY<br>arg = Pitch, BIT NUMBER |
| 3) name = req_scrap<br>position = (x3, y3)<br>method = bin_bit<br>arg = p3, 5 | 3) VARIABLE NAME = req_scrap<br>COORDINATE POSITION = (Left Offset, Top Offset)<br>PROGRAM = BINARY BIT ARRAY<br>arg = Pitch, BIT NUMBER |

| SHEET NUMBER | READING METHOD | DESCRIPTION |
|---|---|---|
| 3765234 | 1) name = user<br>position = (x1, y1)<br>method = userid.prg<br>2) name = req_detail<br>position = (x2, y2)<br>method = bin_bit<br>arg = p2,5<br>3) name = req_scrap<br>position = (x3, y3)<br>method = bin_bit<br>arg = p3,5 | 1) VARIABLE NAME = user<br>COORDINATE POSITION = (x1, y1)<br>PROGRAM = userid.prog BY WHITCH PROCESS IS PERFORMED<br>2) VARIABLE NAME = req_detail<br>COORDINATE POSITION = (Left Offset, Top Offset)<br>PROGRAM = BINARY BIT ARRAY<br>arg = Pitch, BIT NUMBER<br>3) VARIABLE NAME = req_scrap<br>COORDINATE POSITION = (Left Offset, Top Offset)<br>PROGRAM = BINARY BIT ARRAY<br>arg = Pitch, BIT NUMBER |
| 1823746 | ... | ... |
| 9128374 | | |

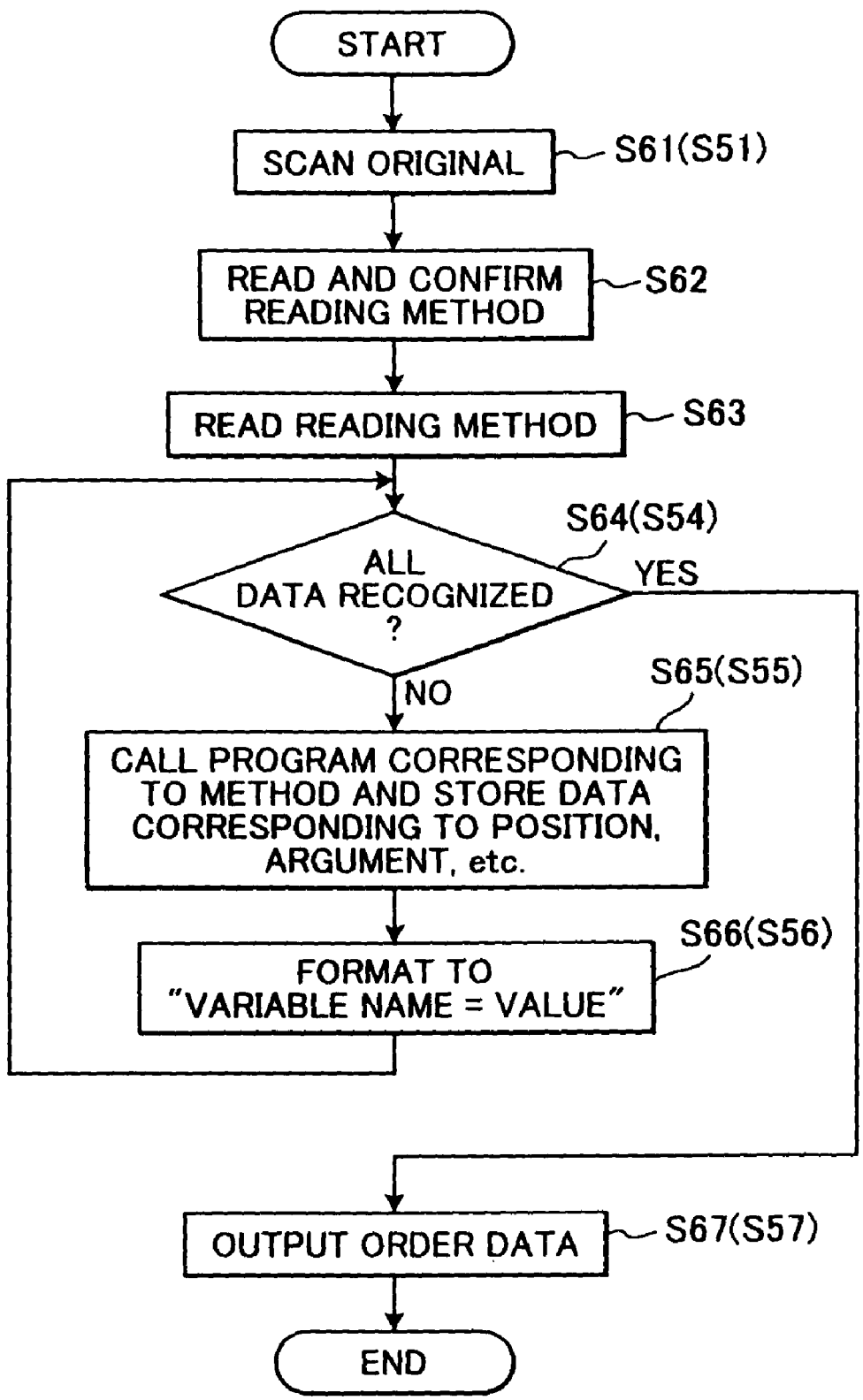

IMAGE FORMING DEVICE THAT PREPARES AND TRANSMITS FORMATTED ORDER DATA TO WEB SERVER

BACKGROUND OF THE INVENTION

1. Field of the Invention

The present invention relates to an image forming device capable of receiving data from a web server, and particularly to an image forming device capable of reducing the processing burden on a web server and capable of increasing the transmission speed by greatly reducing the amount of data transmitted to a web server.

2. Description of the Related Art

Various systems have been proposed for automatically ordering content or other products on the Internet. For example, Japanese unexamined patent application publication No. 2000-29954 discloses a system for automatically receiving orders. This system includes a server and a client. The client could be either a facsimile device or a computer. An original document is scanned by a scanner in the client, and a corresponding image data is transmitted to the server as an order data. The server includes a receiving means for receiving the order data from the client via a communication line, determining means for determining whether the order data is from a facsimile device or a computer, and request processing means for interpreting the image data received as the order data and transmitting a data requested by the order data back to the client. This system is easy to use from the purchaser's standpoint and facilitates data processing by the vendor.

However, in the system described above, the server must analyze the image data and perform a process to identify the details of the order. Hence, an excessive processing load is placed on the server, resulting in a decreased processing rate. Further, the large amount of image data increases the time required for communication.

SUMMARY OF THE INVENTION

In view of the foregoing, it is an object of the present invention to provide an image forming device capable of reducing the processing load on the web server and capable of increasing transmission speeds by greatly lessening the amount of data transmitted to the web server.

In order to overcome the above and other objects, according to the present invention, there is provided an image forming device including a communication unit that communicates bi-directionally with a web server on the Internet, the communication unit receiving an order sheet data including a document data and a method data, an acquiring unit that acquires the document data and the method data from the order-sheet data, a memory that stores the method data, an image forming unit that forms images on a recording medium based on the document data, thereby providing an order sheet, the order sheet including a request specifying area enabling a user to record an order for predetermined data, a scanner that scans the order sheet on which the user has recorded the order in the request specifying area to generate an image data of the order sheet, and an order data creating means for creating an order data from the image data based on the method data stored in the memory. The communication unit transmits the order data to the web server.

BRIEF DESCRIPTION OF THE DRAWINGS

In the drawings:

FIG. 4(a) is an explanatory diagram showing the data structure in a RAM of a web printing unit in the facsimile device;

FIG. 4(b) is an explanatory diagram showing the data structure of a URL data storing unit in the RAM;

FIG. 4(c) is an explanatory diagram showing an example of data structure of record/display settings storing unit in the RAM;

FIG. 5(b) is an explanatory diagram illustrating the data structure of the flag data of FIG. 5(a);

FIG. 10 is an explanatory diagram showing an example of reading method data according to the first embodiment;

FIG. 17 is an explanatory diagram showing an example of reading method data according to the second embodiment of the present invention;

FIG. 20 is a flowchart representing an order process according to the third embodiment of the present invention.

PREFERRED EMBODIMENTS OF THE PRESENT INVENTION

Next, preferred embodiments of the present invention will be described with reference to the accompanying drawings.

Figure 1:
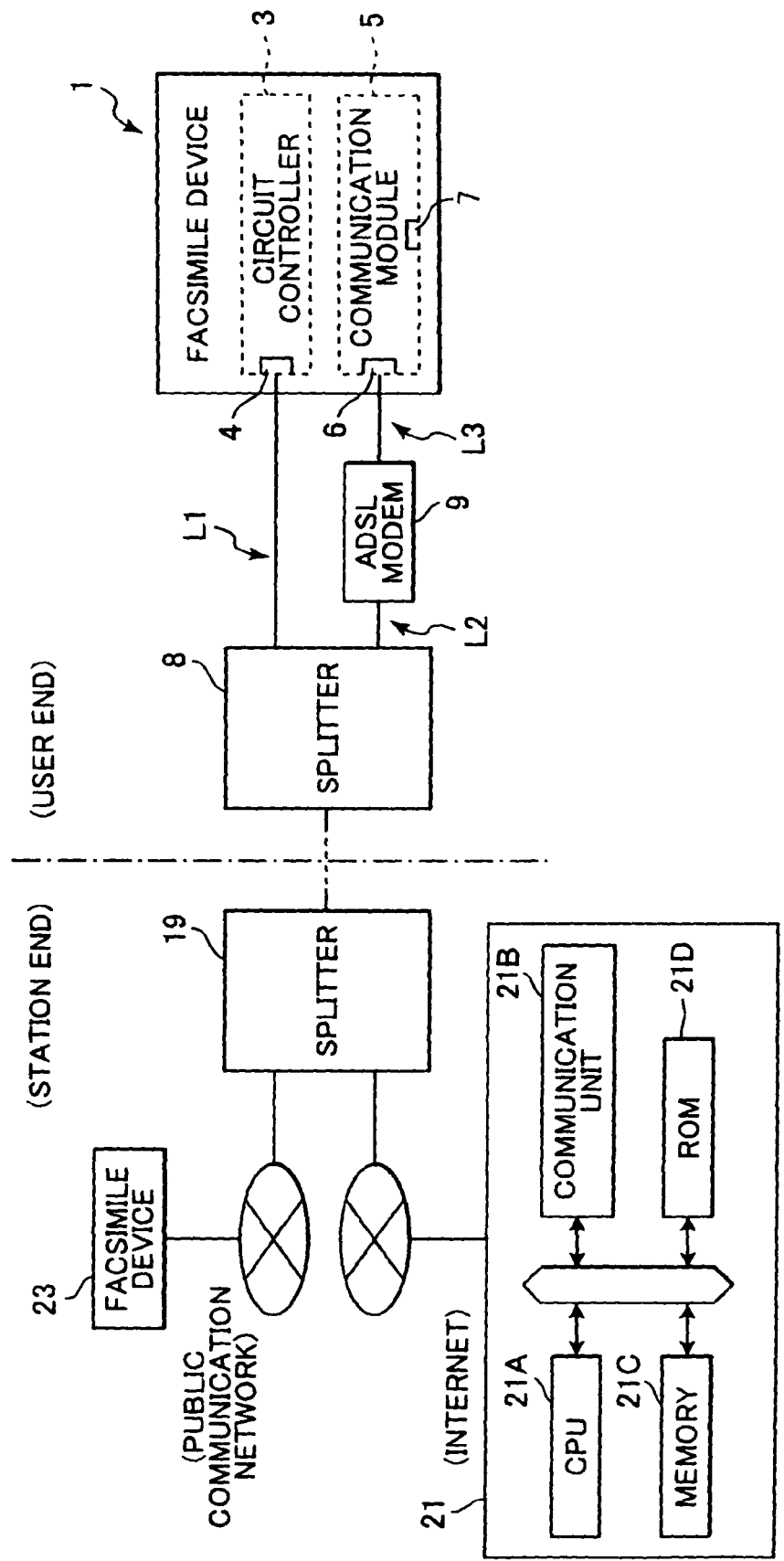
FIG. 1 is a block diagram illustrating an example of using a facsimile device according to an embodiment of the present invention.

As shown in FIG. 1, a facsimile device 1 according to the present embodiment includes a circuit controller 3 and a communication module 5. The circuit controller 3 is provided with an external connection port 4. An analog line L1 (a telephone line formed of either two or four leads) connects between the external connection port 4 and a telephone connection port on a splitter 8 provided in a home office or other building.

The communication module 5 is provided with a WAN connection port 6 and a LAN connection port 7. The WAN connection port 6 is connected to an ADSL modem 9 via a LAN cable L3. The LAN connection port 7 is connected to a local area network (LAN) provided in a building via a hub (not shown). The ADSL modem 9 is connected to an ADSL (Asymmetric Digital Subscriber Line) modem connection port in the splitter 8 via a LAN cable L2.

The splitter 8 is a device used for ADSL well known in the art. The splitter 8 is configured to receive a transmission signal from a splitter 19 provided on the base station end. The transmission signal includes a first signal of about 4 kHz or less superimposed on a second signal of a higher frequency for ADSL. The splitter 8 separates the first and second signals and outputs the first signal to the telephone connection port and the second signal to the ADSL modem connection port. The splitter 8 also superimposes signals received via these connection ports and transmits the superimposed signal to the splitter 19 on the base station end.

That is, the facsimile device 1 of the present embodiment can connect to a subscriber telephone on a public communication network (that is, a public switching telephone network: PSTN) using the circuit controller 3. The facsimile device 1 can also connect to the Internet serving as a wide area network (WAN) via the communication module 5 and the ADSL modem 9.

Through operations of a router controller 101 (FIG. 3) provided in the communication module 5, the facsimile device 1 functions as a router for routing data (IP packets) that is transmitted and received between a communication device on the Internet (such as a web server 21) and LAN terminals on the LAN.

The facsimile device 1 of the present embodiment has a facsimile function, a printer function, and a copy function. The facsimile function optically scans images from an original document, converts image data representing the scanned image into facsimile data, and transmits the facsimile data via the analog line L1 to an external facsimile device 23 connected to the public communication network. The facsimile function also receives facsimile data transmitted from the external facsimile device 23 via the public communication network and the analog line L1, and forms images on a recording paper based on the facsimile data.

The printer function is a function for forming images on a recording paper based on code data transmitted by a word processor or a personal computer connected via the hab. When the facsimile device 1 receives code data from an external personal computer via a PC interface 24 (FIG. 3) or from the personal computer on the LAN via the communication module 5, the facsimile device 1 forms images based on the code data on recording paper. The copy function is a photocopying function for scanning images from an original document using a scanner 35 and a recording unit 37 (described later) and forming images on recording paper based on the image data.

Figure 2:
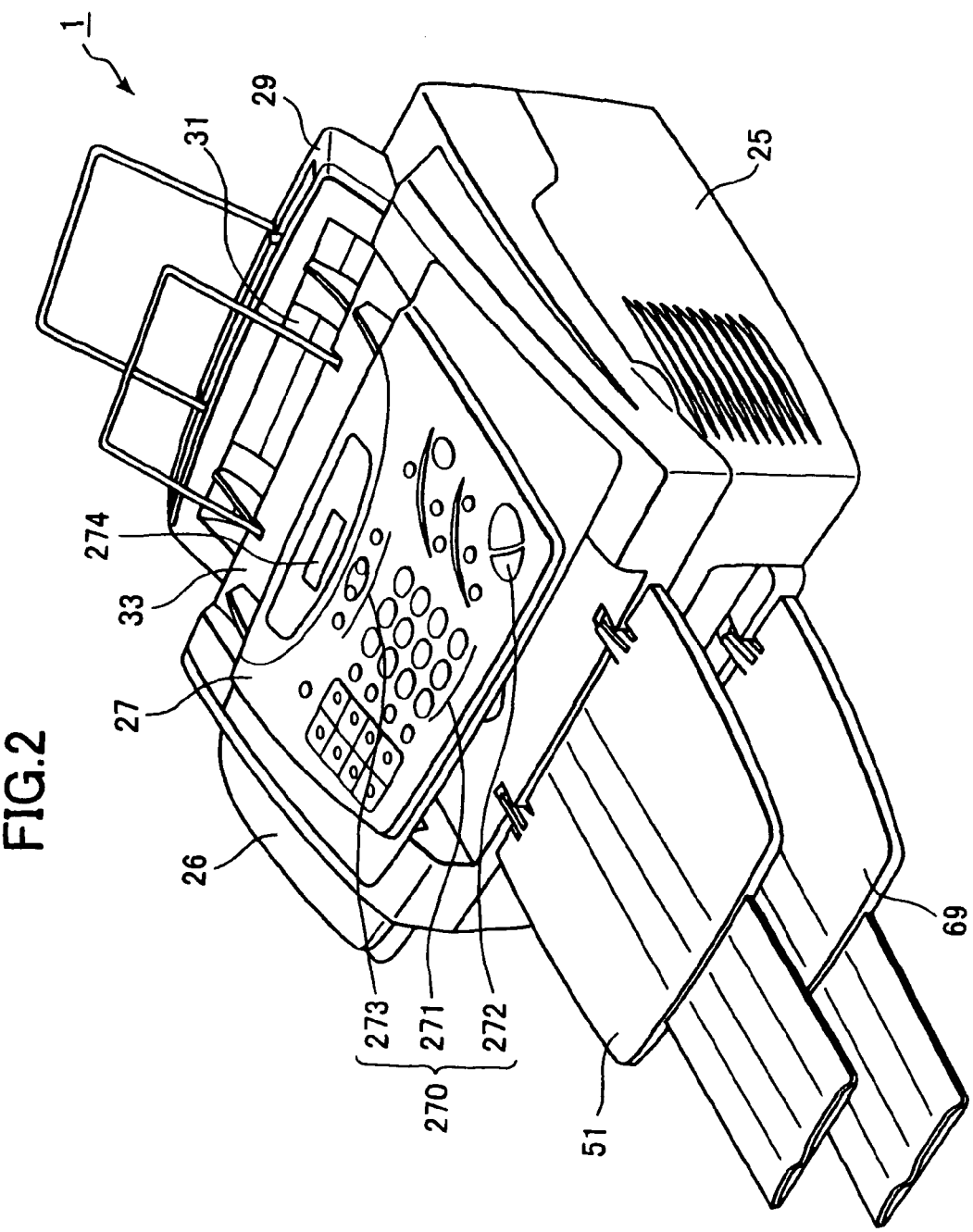
FIG. 2 is a perspective view of the external construction of the facsimile device.

As shown in FIG. 2, the facsimile device 1 having the functions described above includes an outer case 25, a handset 26 mounted on the side of the outer case 25, and an operating panel 27 provided on the front portion of the top surface of the outer case 25. The operating panel 27 is provided with various operating keys 270 including numeral keys 271 for inputting the telephone number (fax number) of other parties, a start key 272, and a select key 273, and a liquid crystal display (LCD) 274 for displaying data related to the various functions.

In addition, a first paper tray 29 for accommodating recording paper to be fed into the device is provided on the top back portion of the outer case 25. A second paper tray 31 is provided above the first paper tray 29 to enable the user to feed recording paper by hand. An original document feed tray 33 is provided above the second paper tray 31 for accommodating original documents to be scanned.

The outer case 25 accommodates the scanner 35 for scanning images from an original document, the recording unit 37 for forming multicolor images on recording paper, and a circuit board (not shown) on which a CPU 39 (FIG. 3) is mounted for controlling the scanner 35 and the recording unit 37.

Next, the electrical configuration of the facsimile device 1 will be described.

Figure 3:
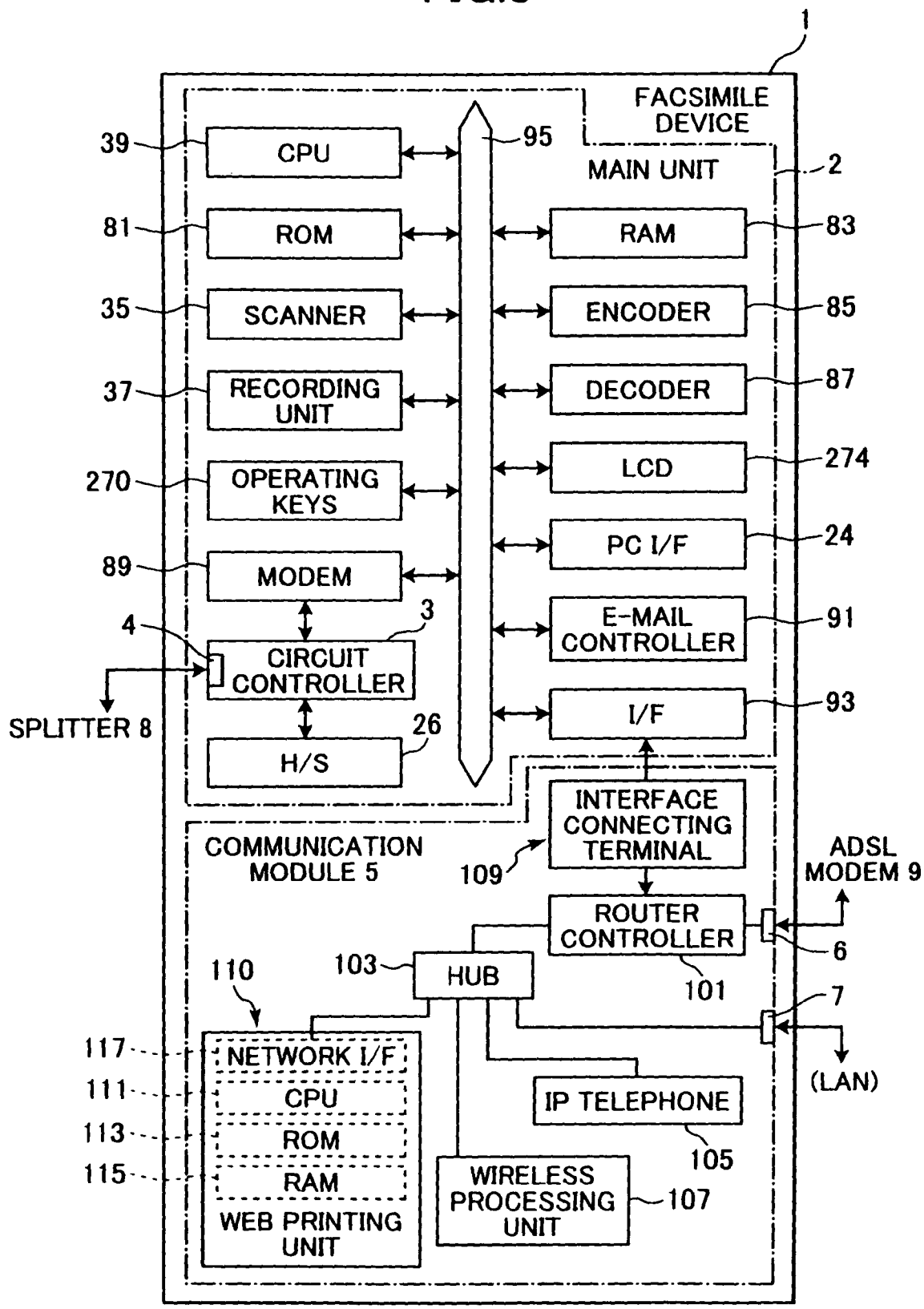
FIG. 3 is a block diagram showing an electrical configuration of the facsimile device.

As shown in FIG. 3, the facsimile device 1 primarily includes the CPU 39, a read only memory (ROM) 81, a random access memory (RAM) 83, the scanner 35, an encoder 85, the recording unit 37, a decoder 87, the operating keys 270, the LCD 274, a modem 89, the circuit controller 3, the PC interface 24, an e-mail controller 91, and a function expansion interface 93. All of these components are connected via a bus 95, and defining a main unit 2. The communication module 5 is connected to the function expansion interface 93.

The CPU 39 serves as the control center of the facsimile device 1 by performing overall control of the facsimile device 1. For example, the CPU 39 reads programs for control processes that are prestored in the ROM 81 and executes processes, such as transmission and reception of facsimile data, address entry, and web printer, according to these programs.

The ROM 81 stores a facsimile function program, a printer function program, a web printer function program, and other programs not shown in the drawings, as well as various data required when executing the programs.

The RAM 83 includes a work area required when executing various control processes and is configured to store destination data, such as telephone numbers and e-mail addresses.

The scanner 35 functions to scan an original document when copying or transmitting facsimile data or the like. The scanner 35 of the present embodiment is configured to pick up the original document from the original document feed tray 33, scan the images with a scanning unit (not shown), and output image data to the encoder 85 and the like as scanning results.

The encoder 85 executes an encoding process for converting image data scanned by the scanner 35 into G3 compressed image data in a facsimile format, and outputs the converted image data. The decoder 87 decodes image data in the facsimile format for converting into image data that can be processed by the recording unit 37.

The recording unit 37 functions as a color laser printer capable of forming color images. The recording unit 37 uses a built-in image forming device (not shown) to print color images based on image data that has been encoded by the decoder 87 and according to instructions from the CPU 39 on recording paper, and discharges the printed recording paper externally.

The operating keys 270 function to input instruction signals into the device (the CPU 39 and the like) based on operations by the user in order to perform such operations as entering destination data, specifying a destination, and inputting or selecting memo data.

The LCD 274 functions as a display device for displaying various messages and the like, including error messages and messages for guiding the user steps of an operation. The LCD 274 also functions as a touch panel. When the user is specifying a destination for facsimile data or entering destination data, the LCD 274 displays one-touch keys and acquires and inputs user-inputted data into the device.

The modem 89 functions to transmit and receive facsimile data to and from the external facsimile device 23 connected to the public communication network via the circuit controller 3 and the splitter 8. The circuit controller 3 functions to transmit dialing signals to the public communication network, to answer calling signals from the public communication network, and the like. For example, the circuit controller 3 connects to and can communicate with the external facsimile device 23 via the public communication network.

The PC interface 24 is employed when connecting a personal computer to the facsimile device 1 via a parallel interface or the like and functions to receive code data and the like from the personal computer. The e-mail controller 91 transmits and receives facsimile data via e-mail by transmitting and receiving e-mail to and from an external communication device connected to the Internet.

In other words, the e-mail controller 91 converts binary image data in a fax format, which was encoded by the encoder 85, into text-coded image data, and adds header data including the e-mail address for the transmission destination and the like to the converted image data. In this manner, the e-mail controller 91 converts the image data in a fax format into image data in an e-mail format that can be transmitted as e-mail. Similarly, the e-mail controller 91 converts image data in an e-mail format received via the Internet and the communication module 5 back to image data in a fax format. The image data converted back in a fax format in this manner is then decoded by the decoder 87 so that the recording unit 37 can output, and the recording unit 37 prints out the data on recording paper.

The function expansion interface 93 is a serial interface, such as AIO (Analog Input/Output) or RS232C. The separate communication module 5 including the router controller 101 can be detachably connected to the function expansion interface 93. The communication module 5 is accommodated in the outer case 25 of the facsimile device 1, as shown in FIG. 3.

The communication module 5 includes the router controller 101, a hub 103, an IP telephone unit 105, a wireless processing unit 107, a web printing unit 110, an interface connecting terminal 109 connected to the router controller 101, and the like. The communication module 5 is connected to the function expansion interface 93 via the interface connecting terminal 109.

The router controller 101 is for transmitting and receiving IP packets between a communication device on the Internet via the ADSL modem 9, and functions as a broadband router well known in the art, having an IP masquerade function and a routing function. Using the IP masquerade function, the router controller 101 can convert both ways between a private IP address used on a LAN and a global IP address used on a WAN (the Internet in the present embodiment). Using the routing function, the router controller 101 can connect a terminal on the LAN end to a communication device on the WAN end (the web server 21) to perform bi-directional communications.

The web printing unit 110 includes a CPU 111, a ROM 113, a RAM 115, a network interface 117, and the like. The web printing unit 110 can connect itself to the Internet or communicate with the CPU 39 of the main unit 2 by communicating with the router controller 101 via the network interface 117.

Next, the data structure in the RAM 115 and the ROM 113 of the web printing unit 110 will be described with reference to FIGS. 4(*a*) through 5(*b*).

As shown in FIG. 4(*a*), the RAM 115 in the web printing unit 110 functions as a work memory 115A, a transmission/reception data storage unit 115B, a URL data storage unit 115C, a transfer destination data storage unit 115D, an access prohibited database 115E, a keyword database 115F, a history data storage unit 115G, a log storage unit 115H, and a record/display setting storage unit 115I.

The transmission/reception data storage unit 115B is for storing data downloaded from the web server 21 and the like. The URL data storage unit 115C is for storing address data (URL: Uniform Resource Locator) indicating data that the web server 21 provides. The transfer destination data storage unit 115D is for storing transfer destination data regarding the destination for transferring data when using a transfer function to transfer data to an external personal computer and the like. The record/display setting storage unit 115I is for recording print settings and display settings.

As shown in FIG. 4(*b*), the URL data storage unit 115C can store a plurality of entries of memo data and scheduler setting data in association with the URL representing the address for accessing the data. In other words, the communication module 5 stores memo data, which the user inputs externally through operations on the operating panel 27 and the like, in association with corresponding URLs into URL data storage unit 115C. As is well known in the art, a URL is address data indicating data that a web server has, and the address data is configured of a server address, directory data, filename, and the like.

Brief description for a process for storing URL-memo data will be provided. The process for storing URL-memo data is executed by the CPU 111 in the web printing unit 110.

First, the CPU 111 transmits an input instruction to the main unit 2 via the function expansion interface 93, so that the LCD 274 displays an input prompt. Next, the CPU 111 waits until an instruction for storing a URL and memo data is received from the operating panel 27 via the function expansion interface 93. When the instruction is received, then the CPU 111 acquires the URL and the memo data, which have been input from the operating panel 27 of the main unit 2. Then, the CPU 111 associates the URL with the memo data, and stores the URL and the memo data in the URL data storage unit 115C.

Here, the memo data is provided to enable the user to quickly determine a desired URL, since it is difficult to determine what home page to access only by the URL display and moreover it is not easy to search for a desired URL because the display area of the LCD 274 is limited.

The transfer destination data storage unit 115D stores printer transfer address data and personal computer transfer address data. The transfer destination data storage unit 115D stores private IP addresses on a LAN and port numbers as address data for printer transfers and personal computer transfers.

As shown in FIG. 4(c), the record/display setting storage unit 115I stores, in correspondence with "specification", a "recording setting" as print setting data for outputting data via the recording unit 37 and a "display setting" as display setting data for displaying data on the LCD 274.

In the example of FIG. 4(c), for the specification of "image output", the data "ON" is stored for the recording setting and "OFF" for the display setting. This indicates that image output for printing is set to ON, while image output for the LCD 274 is set to OFF. For the specification item of "resolution", "600 dpi" is stored for the recording setting and "96 dpi" is stored for the display setting. This indicates that the resolution is set to 600 dpi for printing and 96 dpi for display on the LCD 274.

Figure 5A:
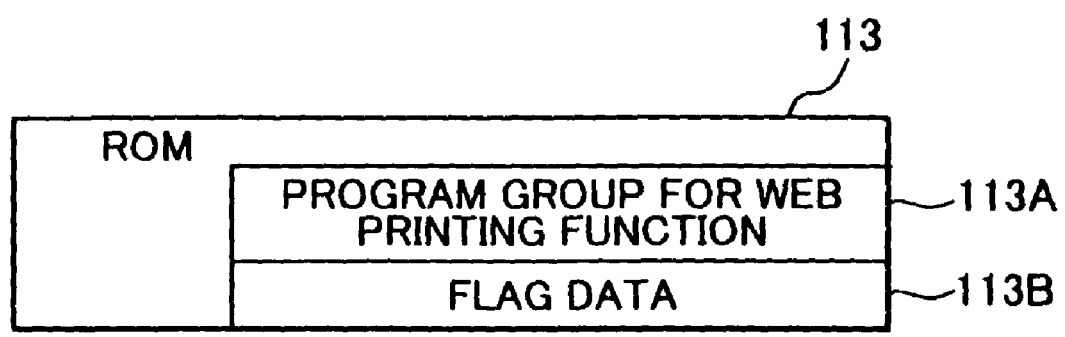
FIG. 5(a) is an explanatory diagram showing data structure in a ROM of the web printing unit.

As shown in FIG. 5(a), the ROM 113 in the web printing unit 110 stores a program group 113A for a web printing function, flag data 113B, and the like. The program group 113A are for acquiring data from the web server 21 and for controlling the recording unit 37 of the facsimile device 1 to print the acquired data. The flag data 113B represents operating conditions of the web printing function.

More specifically, the web printing unit 110 includes a printing function for controlling the recording unit 37 to print images based on data downloaded from the web server 21 via the router controller 101; a saving function for temporarily saving data in the RAM 115; a printer transferring function for transferring downloaded data to the printer (a printer identified by address data stored in the transfer destination data storage unit 115D as the printer transfer destination) connected to the LAN via the LAN connection port 7; a personal computer transferring function for transferring downloaded data to the personal computers connected to the LAN via the LAN connection port 7; a monochrome printing function for instructing the recording unit 37 to print monochrome images based on downloaded data; a quiet printing function for controlling the recording unit 37 to print images based on the downloaded data in the quiet print mode for suppressing device noise during the printing process; a log saving function for saving log data for various processes executed by the web printing unit 110; and an error data displaying function for displaying error messages on the LCD 274. These functions are implemented by the program group 113A stored in the ROM 113. The functions can be toggled ON and OFF based on flags set in flag setting data 113B (FIG. 5(b)) stored in the RAM 115. Details will be described below.

The web printing unit 110 stores flag setting data into the RAM 115 according to prescribed conditions in a following manner. FIG. 5(b) is an explanatory diagram illustrating the data structure of the flag data 113B stored in the ROM 113. According to prescribed conditions, the web printing unit 110 selects one of operating modes shown in FIG. 5(b). The operating modes include a "normal" operating mode, a "URL access not authorized" operating mode, a "cancel print" operating mode, a "password error" operating mode, a "keyword error" operating mode, a "same content detected" operating mode, a "nighttime print" operating mode, an "answering machine" operating mode, a "large volume monochrome printing" operating mode, an "out-of-paper error" operating mode, and an "out-of-toner error" operating mode.

Then, the web printing unit 110 retrieves function values (hereinafter referred to as "flag values") of the selected operating mode, and stores the retrieved flag values into the RAM 115 as the flag setting data. The web printing unit 110 operates the function (ON) when the flag value is "1" or greater and prevents operation of the function (OFF) when the flag value is "0". The asterisk (*) symbol indicates that the flag value stored as the flag setting data prior to selecting the operating mode cannot be overwritten.

Figure 6A:
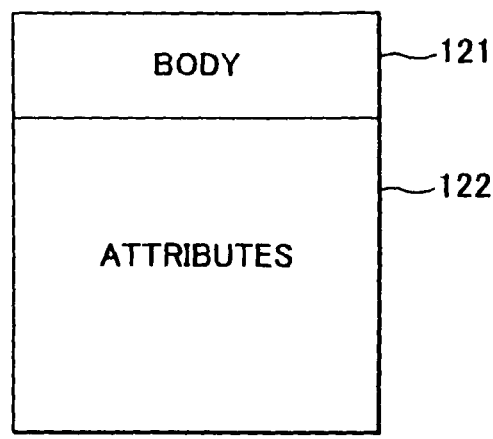
FIG. 6(a) is an explanatory diagram showing the structure of data downloaded via a router controller by a CPU in the web printing unit.
Figure 6B:
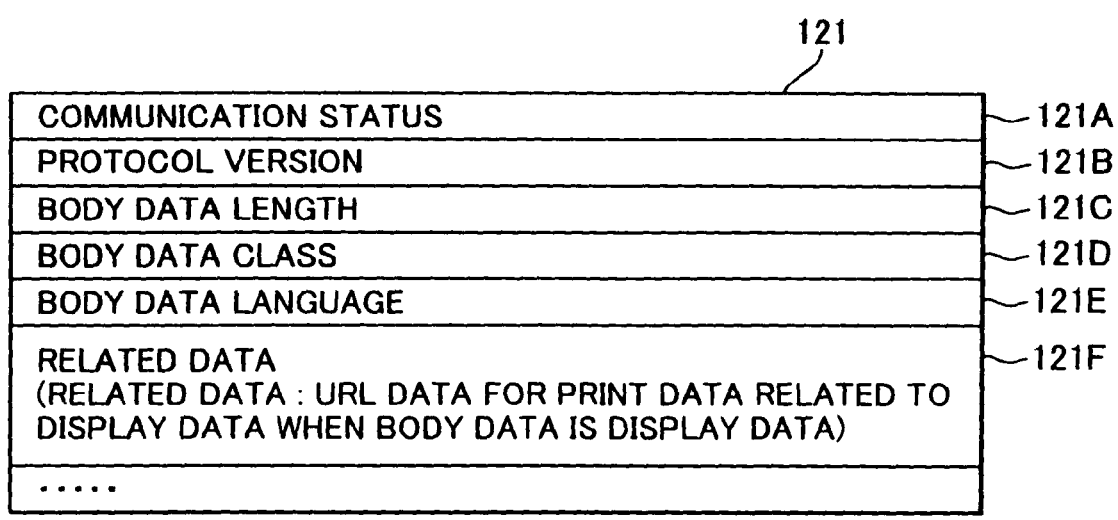
FIG. 6(b) is an explanatory diagram showing the data structure of attributes of the data of FIG. 6(a)

Next, the structure of data downloaded by the CPU 111 via the web printing unit 110 will be described. As shown in FIG. 6(a), data downloaded via the web printing unit 110 includes attributes 121 and a body 122. As shown in FIG. 6(b), the attributes 121 include a communication status 121A indicating whether communication with the web server 21 has completed normally and including an error code or the like when the communication process has not ended normally; a protocol version 121B representing the version of the communication protocol; a body data length 121C representing the amount of data in the body 122; a body data class 121D expressing whether the data in the body 122 includes both document data and reading method data; a body data language 121E expressing the language type of the text (HTML, XHTML, etc.) used in the body 122; related data 121F configured of URL data for print data related to the display data when the body data is display data; and the like.

The body 122 is configured of HTML (HyperText Markup Language), image files, PDL (Printer Description Language) that can be directly recognized by the recording unit 37, or the like.

Here, a brief description will be provided for an electrical configuration of the web server 21. As shown in FIG. 1, the web server 21 includes a CPU 21A, a communication unit 21B, a memory 21C, and a ROM 21D. The CPU 21A performs overall control of the web server 21. The communication unit 21B communicates bi-directionally with remote devices, such as the facsimile devices 1 and 23, via the Internet. The memory 21 stores various data, such as scrapbook entries. The ROM 21D stores various programs including a program for a reception process to be described later. Because the configuration of the web server 21 is well known in the art, further detailed description thereof will be omitted.

Figure 7:
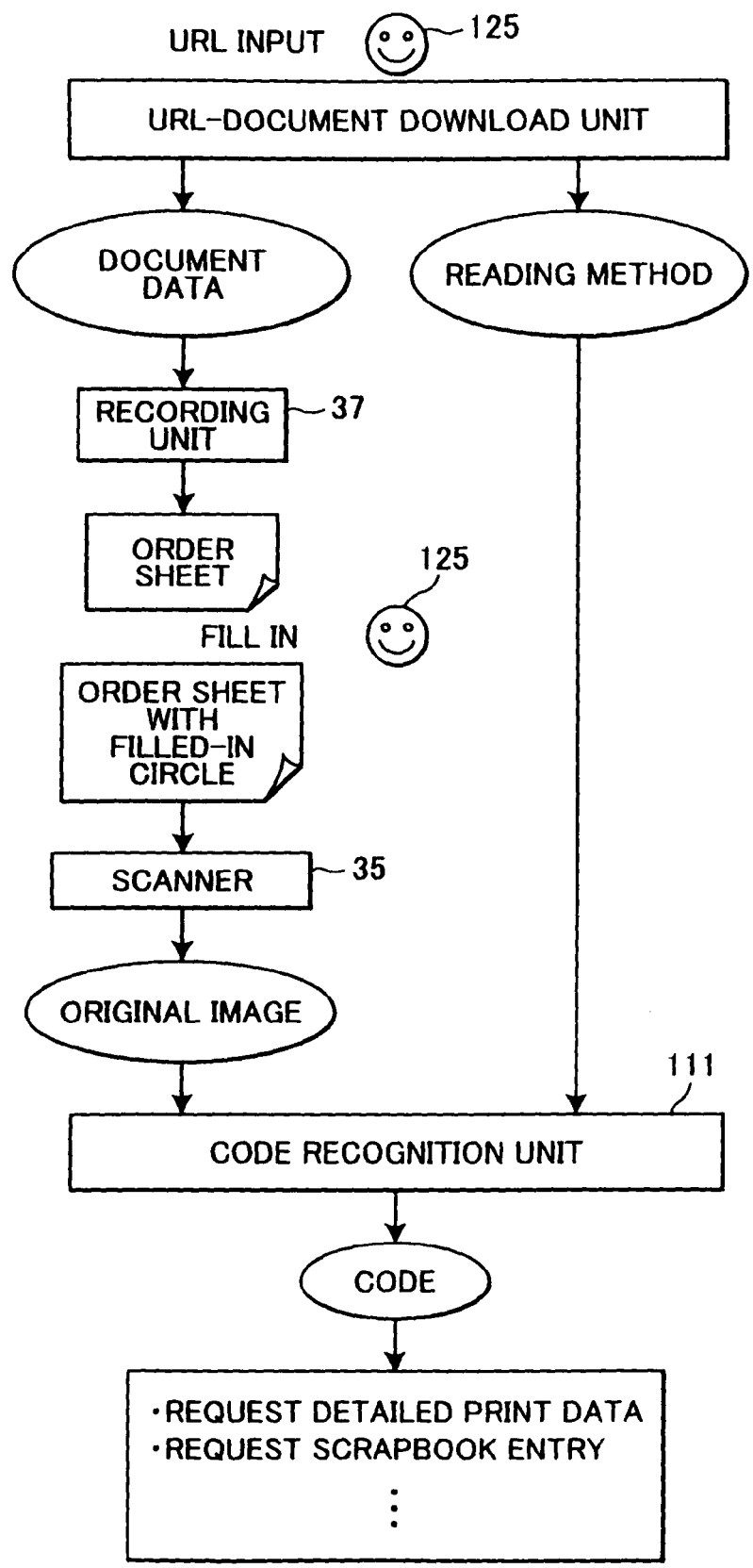
FIG. 7 is an explanatory diagram showing an order procedure according to a first embodiment of the present invention, the order procedure to receive data including both document data and reading method data at the facsimile device from the web server on the Internet and for acquiring content desired by the user from the web server using a printed order sheet.

Next, an order procedure according to a first embodiment of the present invention will be described. The order procedure is for receiving data including both document data and reading method data at the facsimile device 1 from the web server 21 on the Internet and for acquiring content desired by the user from the web server 21 using printed order sheet. FIG. 7 is an explanatory diagram showing the order procedure. The order procedure of the present embodiment is implemented by a content acquire process, an order process, and a reception process.

Figure 8:
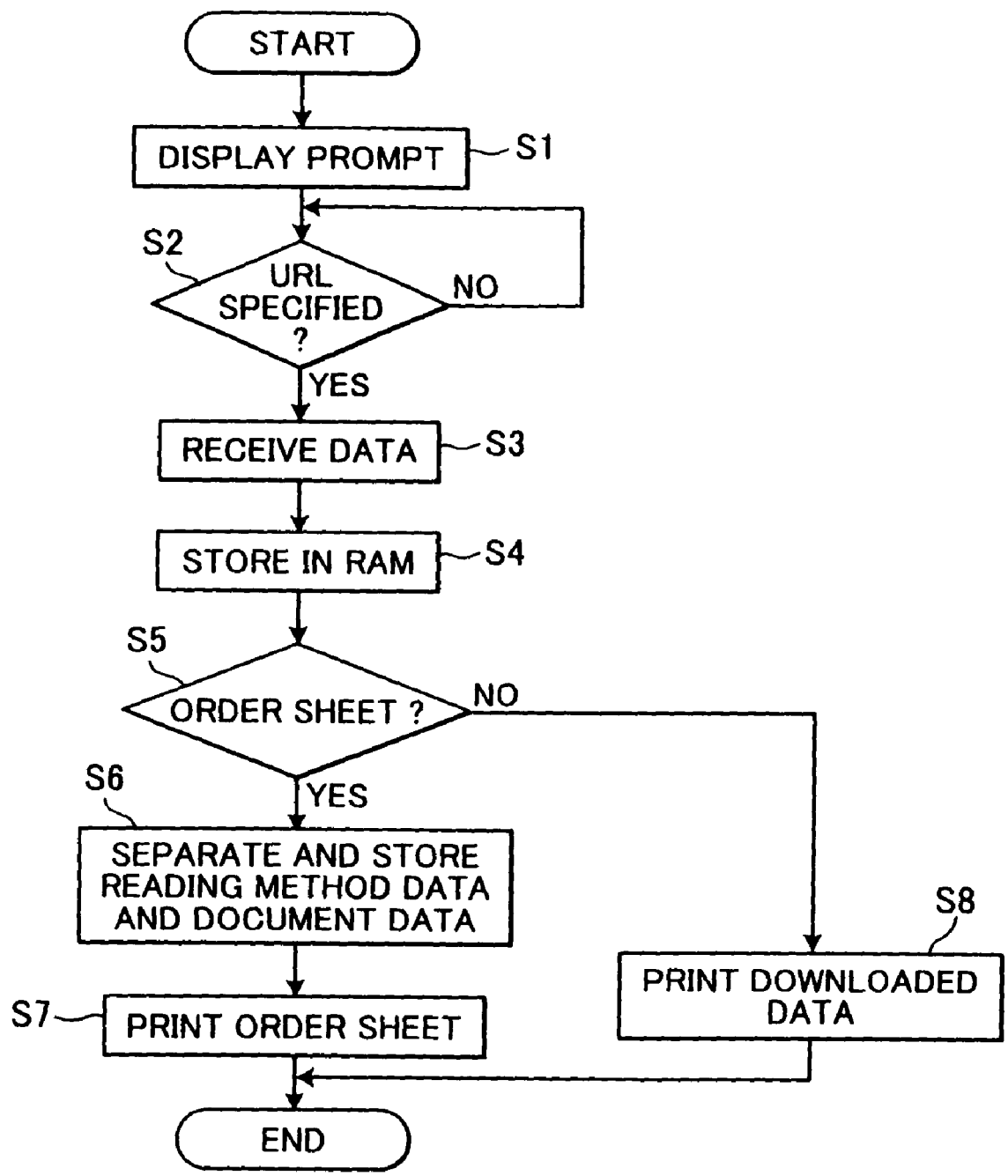
FIG. 8 is a flowchart representing a content acquire process according to the first embodiment executed by a CPU in the web print unit of the facsimile device.

First, the content acquire process will be described while referring to FIG. 8. The content acquire process of FIG. 8 is executed by the CPU 111 for acquiring content from the web server 21 and started when a user 125 (FIG. 7) presses a Web Print key (not shown) provided on the operating panel 27. Once the process starts, first in S1, the CPU 111 displays an input prompt on the LCD 274 prompting the user 125 to specify a desired URL. Here, the user 125 can specify a desired URL either by directly inputting the URL character string or by selecting one URL from a displayed URL list, for example. In S2, the CPU 111 determines whether or not a URL has been specified. Here, the CPU 111 determines that the URL has been specified if an input complete signal was received from the operating panel 27 via the interface 93, the router controller 101, the HUB 103, and the network interface 117. If a URL has not been specified (S2:NO), then the process waits until a URL is specified. On the other hand, if so (S2:YES), then in S3, the CPU 111 acquires data representing the specified URL and downloads data specified by the URL from the web server 21. In S4, the downloaded data is stored into the transmission/reception data storage unit 115B of the RAM 115.

Next, in S5, the CPU 111 determines whether or not the downloaded data is data that includes document data and reading method data. This determination is made by reading data from the body data class 121D of the attributes 121 in the downloaded data. If the body data class 121D indicates that the body 122 of the downloaded data includes the document data and the reading method data, then a positive determination is made in S5. On the other hand, if the body data class 121D does not indicate that the body 122 of the downloaded data includes the document data and the reading method data, then a negative determination is made in S5.

If it is determined in S5 that the downloaded data is data including the document data and the reading method data (S5:YES), then in S6, the CPU 111 reads both the document data and the reading method data from the body 122 of the downloaded data, and stores each separately in the work memory 115A. Then, in S7, the CPU 111 outputs the document data stored in the work memory 115A to the recording unit 37 via the interface 93, so that the recording unit 37 prints out the document data based on a resolution and other recording settings stored in the record/display setting storage unit 115I so as to provide an order sheet. Then, the process ends.

With this process, the order sheet is printed out for the user 125, and the reading method data for the order sheet is temporarily stored in the work memory 115A.

On the other hand, if it is determined in S5 that the downloaded data is not the data including the document data and the reading method data (S5:NO), then in S8, the CPU 111 transmits the downloaded data to the recording unit 37 via the interface 93, so that the recording unit 37 prints out the downloaded data based on the resolution and other recording settings stored in the record/display setting storage unit 115I. Then, the process ends.

Figure 9:
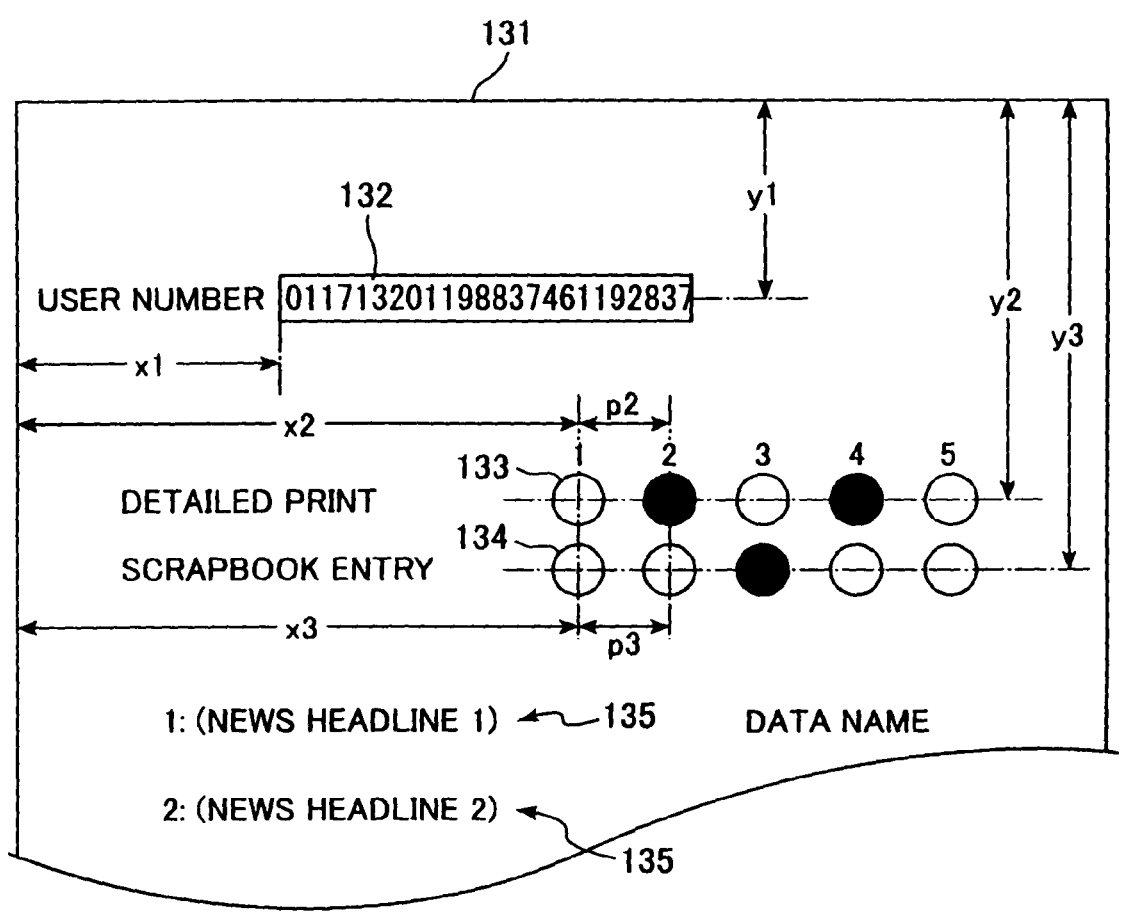
FIG. 9 is an explanatory diagram showing an example of order sheet according to the first embodiment.

An example of the order sheet printed in S7 of FIG. 8 is shown in FIG. 9. As shown in FIG. 9, the order sheet 131 acquired from the web server 21 is printed with a user number 132, five unfilled circles 133 in a print data request specifying area, five unfilled circles 134 in a scrapbook entry request specifying area, and data names 135.

The user number 132 is a 24-digit number and positioned a distance x1 from the left edge and a distance y1 from the top edge of the order sheet 131. The user number 132 is identification data for identifying the user 125 to which the web server 21 has been transmitted the document data and the reading method data. That is, a URL specifying the user 125 is stored as transmission destination data on the web server 21 in association with the user number 132.

The five unfilled circles 133 each having a prescribed diameter are arranged horizontally at a pitch p2, beginning at a position a distance x2 from the left edge and a distance y2 from the top edge of the order sheet 131. The five unfilled circles 134 each having a prescribed diameter are arranged horizontally at a pitch p3 below the circles 133, beginning at a position a distance x3 from the left edge and a distance y3 from the top edge of the order sheet 131.

The numbers 1 to 5 are printed from left to right above the circles 133. These numbers 1 to 5 are associated with numbers printed to the left of each of the data names 135 written in vertical succession below the unfilled circles 134.

For example, the number "1" above the circles 133 is associated with the number "1" left of "News headline 1". The number "2" above the circles 133 corresponds to "2" to the left of "News headline 2".

By filling in select circles 133, the user 125 can specify data which the user 125 requests the web server 21 to transmit detailed print data of. In the similar manner, by filling in select circles 134, the user 125 can specify data which the user 125 requests the web server 21 to temporarily store on the web server 21 as a scrapbook entry.

In example of FIG. 9, the circles 133 under numbers 2 and 4 are filled in by the user 125. This represents an order requesting detailed print data for the data names 2 and 4. Also, the circle 134 under the number 3 is filled in by the user 125. This represents an order requesting the web server 21 to temporarily store data for the data name 3 on the web server 21.

Next, example of reading method data received along with the document data will be described with reference to FIG. 10. A reading method data 141 shown in FIG. 10 includes three data entries to be read and defines the reading method of reading each data.

In a first data entry, "name=user" indicates "variable name=user", which indicates that a corresponding variable is a user number. "position=(x1,y1)" indicates the coordinate position (x1, y1) of the variable on the order sheet 131. In other words, this indicates that the user number is located at a position a distance x1 from the left edge and a distance y1 from the top edge of the order sheet 131. "method=userid.prg" indicates a program called "userid.prg" by which a process is performed. In other words, the user number is read by the program "userid.prg". This program is downloaded together with the reading method data 141 and temporarily stored in the RAM 115.

In a second data entry, "name=req_detail" indicates that "variable name=req_detail", and also that a variable is identification data identifying detailed print data requested by using the circles 133 in the print data request specifying area. Further, "position=(x2,y2)" indicates the coordinate position (x2, y2) of the variable on the order sheet 131. That is, the print data request specifying area is positioned a distance x2 from the left edge and a distance y2 from the top edge of the order sheet 131. "method=bin_bit" indicates that the process is performed by binary bit array program. That is, an unfilled circle 133 is converted to the value "0", and a filled circle 133 is converted to the value "1". "arg=p2,5" indicates "arg=Pitch, bit number". That is, the print data request specifying area is configured of five circles 133, for 5-bits worth, separated by a pitch p2. Here, the binary bit array program is stored as a subroutine program of the program group 113A in the ROM 113.

In a third data entry, "name=req_scrap" indicates "variable name=req_scrap", and also that a variable is identification data identifying data that is requested by using the circles 134 in the scrapbook entry request specifying area to be temporarily stored as the scrapbook entry. Further, "position-(x3, y3)" indicates the coordinate position (x3, y3) of the variable on the order sheet 131. That is, the print data request specifying area is positioned a distance x3 from the left edge and a distance y3 from the top edge of the order sheet 131. "method=bin bit" indicates that a process is performed by the binary bit array program. For example, an unfilled circle 134 is converted to the value "0", and a filled circle 134 is converted to the value "1". "arg=p3,5" indicates "arg=Pitch, bit number", that is, that the scrapbook entry request specifying area is configured of five circles 134, for 5-bits worth, separated by a pitch p3.

Next, the order process executed by the CPU 111 will be described with reference to the flowchart of FIG. 11 and the example of FIG. 9. In this control process, the CPU 111 scans the order sheet 131 filled in by the user 125 using the scanner 35 and transmits order data to the web server 21.

The order process is started when the user 125 inserts the order sheet 131, whose circles 133, 134 are filled in by the user 125 as desired, into the manual-feed second paper tray 31 of the facsimile device 1 and specifies a server program URL of the web server 21 in a well-known manner. Here, the user 125 can specify the server program URL either by directly inputting the URL character string or by selecting one URL from a displayed URL list, for example. When the order process starts, first in S11, the CPU 111 scans the order sheet 131 using the scanner 35 and obtains corresponding image data. In S12, the CPU 111 stores the image data into the RAM 115.

In S13, the CPU 111 reads the reading method data 141 from the work memory 115A. In S14, the CPU 111 determines whether or not all data entries of the reading method data 141 have been read. If not (S14:NO), then in S15, the CPU 111 reads a first data entry in the reading method data 141 from the work memory 115A, reads relevant data from the image data according to a program corresponding to "method" of the first data entry, and stores the relevant data sequentially in the RAM 115. Then, in S16, the CPU 111 converts data extracted from the RAM 115 to the format "variable name=value" and stores the formatted data in the RAM 115.

In the example of FIG. 9, "user" and the number sequence "0117132011988374611928371" are read as the variable name and the user number, respectively, by the program "method-userid.prg", and then stored in the RAM 115 in S15. Then, formatted data "user=0117132011988374611928371" is stored in the RAM 115 as "variable name 1=value 1" in S16.

Then, the process returns to S14. Because not all data entries have been read in this example (S14:NO), then in S15, the CPU 111 reads a second data entry of the reading method data 141 from the work memory 115A, and the above-described processes are performed. That is, in S15, "req_detail" and "01010" are read as the variable name and the binary data, respectively, by the program "method=bin_bit", and both are sequentially stored in the RAM 115. Then, in S16, formatted data "req_detail=01010" is stored in the RAM 115 as "variable name 2=value 2".

Once again, the process returns to S14. Since not all data entries have been read in this example (S14:NO), then in S15, the CPU 111 reads a third data entry from the reading method data 141 from the work memory 115A, reads "req_scrap" and "00100" as the variable name and binary data by the program "method=bin_bit", and stores the both in the RAM 115. Then, in S16, the CPU 111 stores formatted data "req_scrap=00100" in the RAM 115 as "variable name 3=value 3".

When the process again returns to S14, the CPU 111 determines that all data entries in the reading method data 141 have been read (S14:YES), then in S17, the CPU 111 functioning as a code recognition unit (FIG. 7) reformats all data corresponding to the reading method data 141 as "server program URL?variable name 1=value 1&variable name 2=value 2& . . . " ("CODE" in FIG. 7), and transmits the same to the web server 21 as the order data, via the HUB 103, the router controller 101, the WAN connection port 6, the ADSL modem 9, and the like. In the present example, if a URL indicating a server program of the web server 21 (the server program URL specified by the user) is "http://www.aaa.com/request", then "http://www.aaa.com/request?user=0117132011988374611928371&req_detail=01010&req?scrap=00100" is transmitted to the web server 21 as the order data. In other words, the order data of the present embodiment is a URL accompanied with input data for a server program. Then, the process ends.

Next, the reception process executed by the CPU 21A of the web server 21 will be described with reference to the flowchart of FIG. 12. The reception process is started when the web server 21 receives the order data from the facsimile device 1. In this example, it is assumed that the above order data "http://www.aaa.com/request?user=0117132011988374 61192837&req_detail=01010&req?scrap=00100" has been received.

First in S21, the CPU 21A determines whether or not all arguments following the address data (URL) have been read from the order data. If not (S21:NO), then a first argument is read in S22. In this example, the first argument is "user".

In S23, the CPU 21A determines whether the first argument is "user". If not (S23:NO), then the process proceeds to S28. On the other hand, if so (S23:YES), then the process proceeds to S24. In this example, the first argument is "user", so a positive determination is made in S23 (S23:YES). Then, in S24, the CPU 21A reads "value 1" corresponding to the "user" as the user number for identifying the user 125. In this embodiment, the "value 1" corresponding to the "user" is "0117132011988837461192837".

In S25, the CPU 21A determines whether or not the user number has been registered as a user to which the document data had been transmitted previously from the web server 21. If not (S25:NO), then in S26, "authorization error response" indicating that the user is not registered is created. In S27, the response "authorization error response" is transmitted to the user 125, and the process ends.

On the other hand, if the user number in the first argument has been registered (S25:YES), then the process proceeds to S28. In this example, it is assumed that the user number has been registered.

In S28, the CPU 21A determines whether or not a next argument is "req_detail". If not (S28:NO), then the process proceeds to S30. In this example, however, the next argument is "req_detail" (S28:YES), then in S29, the CPU 21A reads "value 2" corresponding to "req_detail", reads detailed data of the relevant content, creates and stores "content response". In this example, "01010" is read as the "value 2", detailed data for "News headline 2" and "News headline 4" are read, and "content response" is created and stored in a predetermined area in the memory 21C. Then, the process proceeds to S30.

In S30, the CPU 21A determines whether or not the next argument is "req_scrap". If not (S30:NO), then the process proceeds to S32. However, in this example, the next argument is "req_scrap" (S30:YES). Therefore, the process proceeds to S31, where the CPU 21A reads "value 3" corresponding to the "req_scrap", reads data for the relevant content, and stores the data in the scrapbook (not shown) on the memory 21C. In this example, "00100" is read as the "value 3", and the data for "News headline 3" is read and stored in the scrapbook. Then, the program proceeds to S32.

In S32, the CPU 21A determines whether the next argument is "get_scrap". If not (S32:YES), then in S33, the CPU 21A reads "value 4" corresponding to the "get_scrap", reads data for the relevant content stored in the scrapbook, and creates "scrapbook content response" and stores the same in a predetermined area in the memory 21C. Then, the process returns to S21. Because there is no more argument in this example, a negative determination is made in S32 (S32:NO), and the process directly returns to S21.

In S21, the CPU 21A determines that all arguments following the address data (URL) have been read (S21:YES) in this example, then in S34 the CPU 21A determines whether all arguments are "user".

If so (S34:YES), then in S35, the CPU 21A creates "order document response", which is data including document data and reading method data. Then, in S27, the CPU 21A transmits the response "order document response" to the user 125 by the communication unit 21B, and then the process ends. That is, the facsimile device 1 can acquire the data including the document data and the reading method data by transmitting a formatted order data including a URL and argument "user" following the URL.

However, in this example, not all the arguments are "user" (S34:NO). Therefore, in S36, the CPU 21A reads "content response" and/or "scrapbook content response" from the memory 21C, and then in S27, transmits the response(s) to the user 125. In this example, the web server 21 transmits the "content response" for a detailed print data of "News headline 2" and "News headline 4" to the facsimile device 1. Subsequently, the process ends.

As described above, the facsimile device 1 can receive detailed print data of desired content as "content response" from the web server 21 and also can have data for desired content temporarily stored in the scrapbook.

Because the facsimile device 1 transmits the order data which is the formatted data to the web server 21, the web server 21 does not need to create the order data from received image data. Hence, the processing load on the web server 21 can be decreased. Further, the amount of data transmitted to the web server 21 can be greatly decreased, thereby improving the transfer rate.

The user 125 fills in desired circles 133 and 134 in the order sheet 131, and inserts the order sheet 131 to be scanned by the scanner 35. Formatted order data including a predetermined URL is created and transmitted to the web server 21. Hence, the user need not operate input keys or the like to input all data necessary for creating the order data, thereby making operations more user-friendly.

Because the web server 21 temporarily stores data into the memory 21C as requested by the user 125, the user 125 can obtain and print the data when necessary by using the order sheet 131 with the filled-in circles 134.

The circles 133 and 134 are read reliably by the recording unit 37 even when the scanning accuracy of the recording unit 37 is low, thereby enabling the manufacture of a compact recording unit 37 that can reduce manufacturing costs.

Further, the facsimile device 1 can easily determine whether or not the downloaded data is the data that includes the document data and the reading method data by referencing the body data class 121D of the downloaded data. Accordingly, the facsimile device 1 can quickly perform the determination process and can reduce the program volume, thereby enabling the required memory capacity to be reduced.

Since the order data is formatted as a URL, the facsimile device 1 can directly specify data possessed by the prescribed web server 21, thereby greatly reducing the processing load on the web server 21 that receives the order data.

In this embodiment, reading method data for the order sheet 131 is temporarily stored in the work memory 115A of the RAM 115. However, the reading method data for this data could be stored in the work memory 115A until a prescribed operation is executed. In this case, the reading method data can be associated just with specifications of the order sheet 131 currently being processed.

Figure 13:
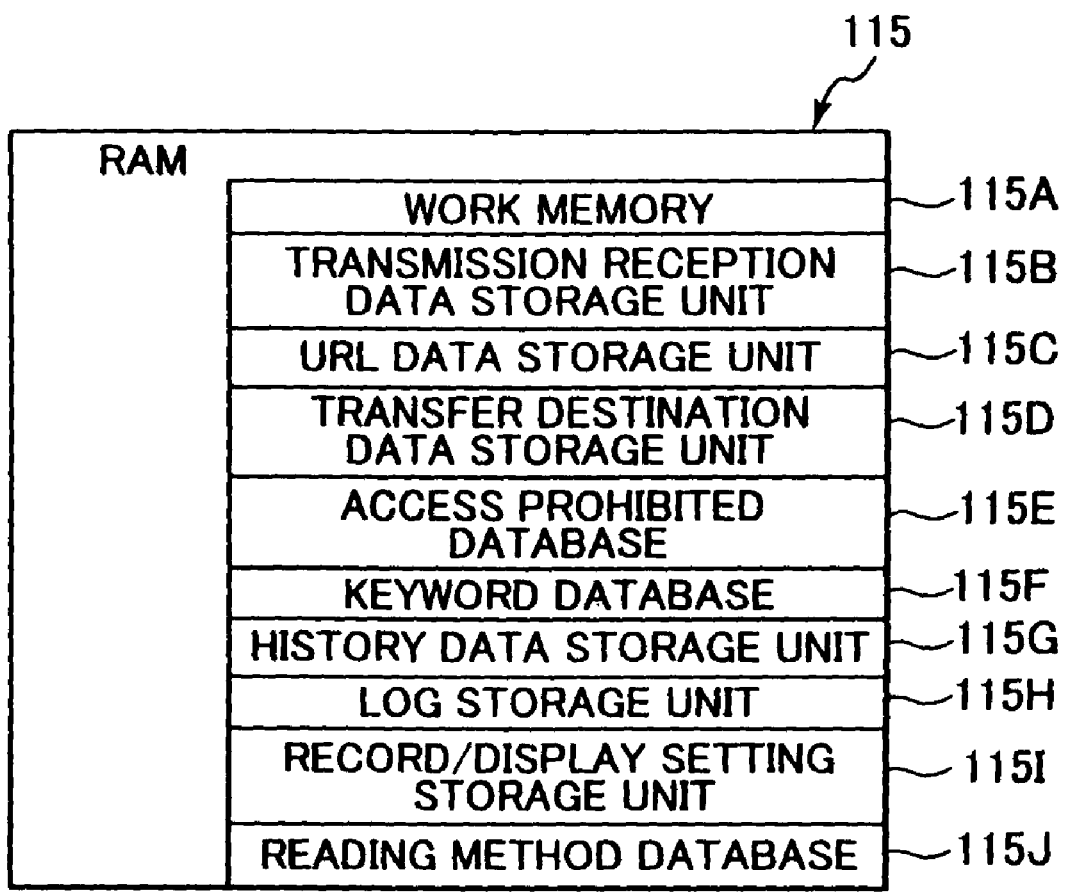
FIG. 13 is an explanatory diagram showing a sample data structure of the RAM in the web print unit of the facsimile device.
Figure 14:
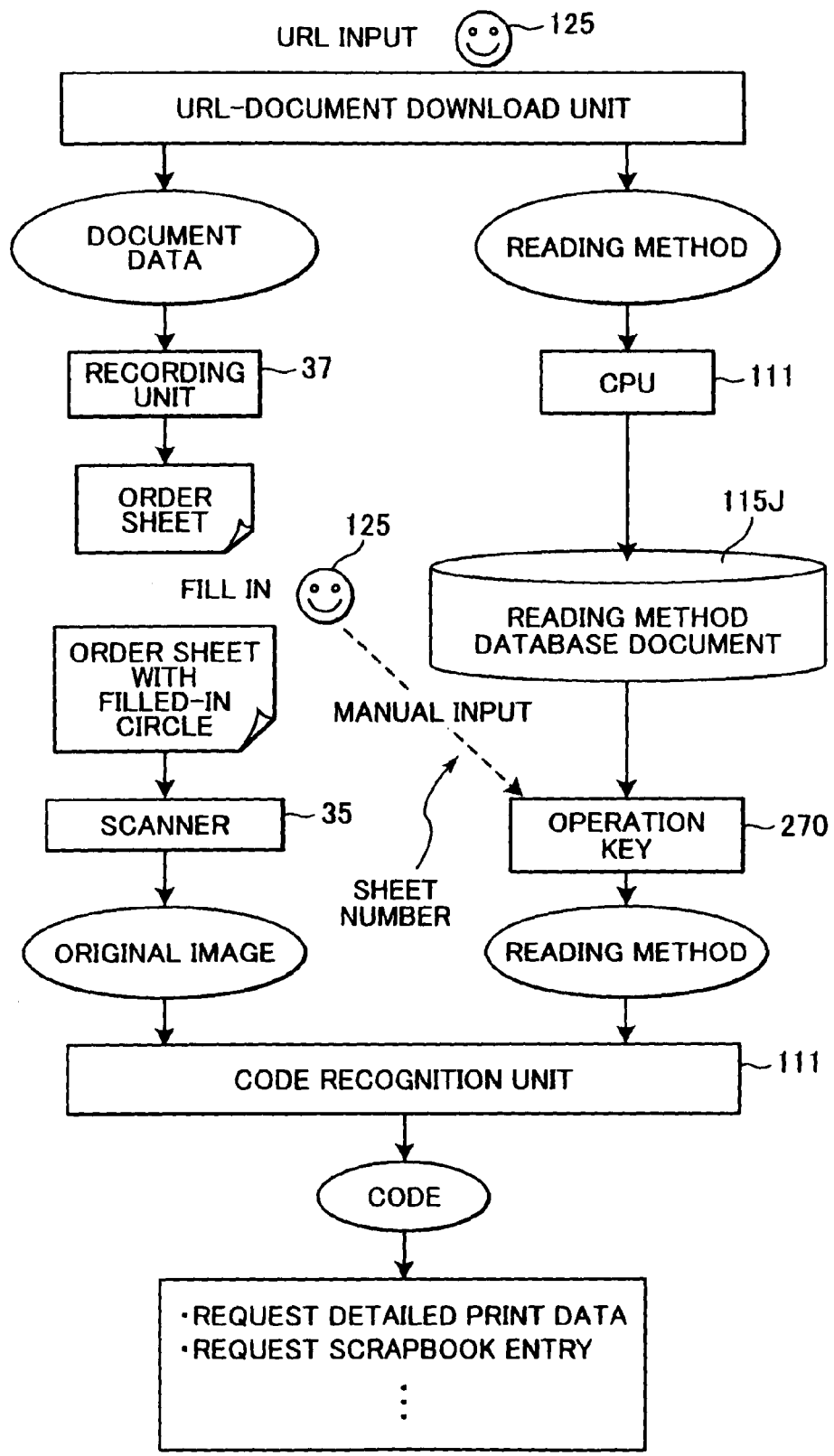
FIG. 14 is an explanatory diagram showing an order procedure according to a second embodiment of the present invention.

Next, an order procedure according to a second embodiment of the present invention will be described. FIG. 14 is an explanatory diagram showing the order procedure. Here, in order to implement the order procedure of the present embodiment, it is necessary for the RAM 115 of the facsimile device 1 to store a reading method database 115J as shown in FIG. 13 in addition to the above described databases and the like 115A to 115I. Also, reading method data that is transmitted from the web server 21 along with document data is appended with sheet number data.

A content acquire process according to the second embodiment executed by the CPU 111 for acquiring content from the web server 21 will be described while referring to FIG. 15.

Figure 15:
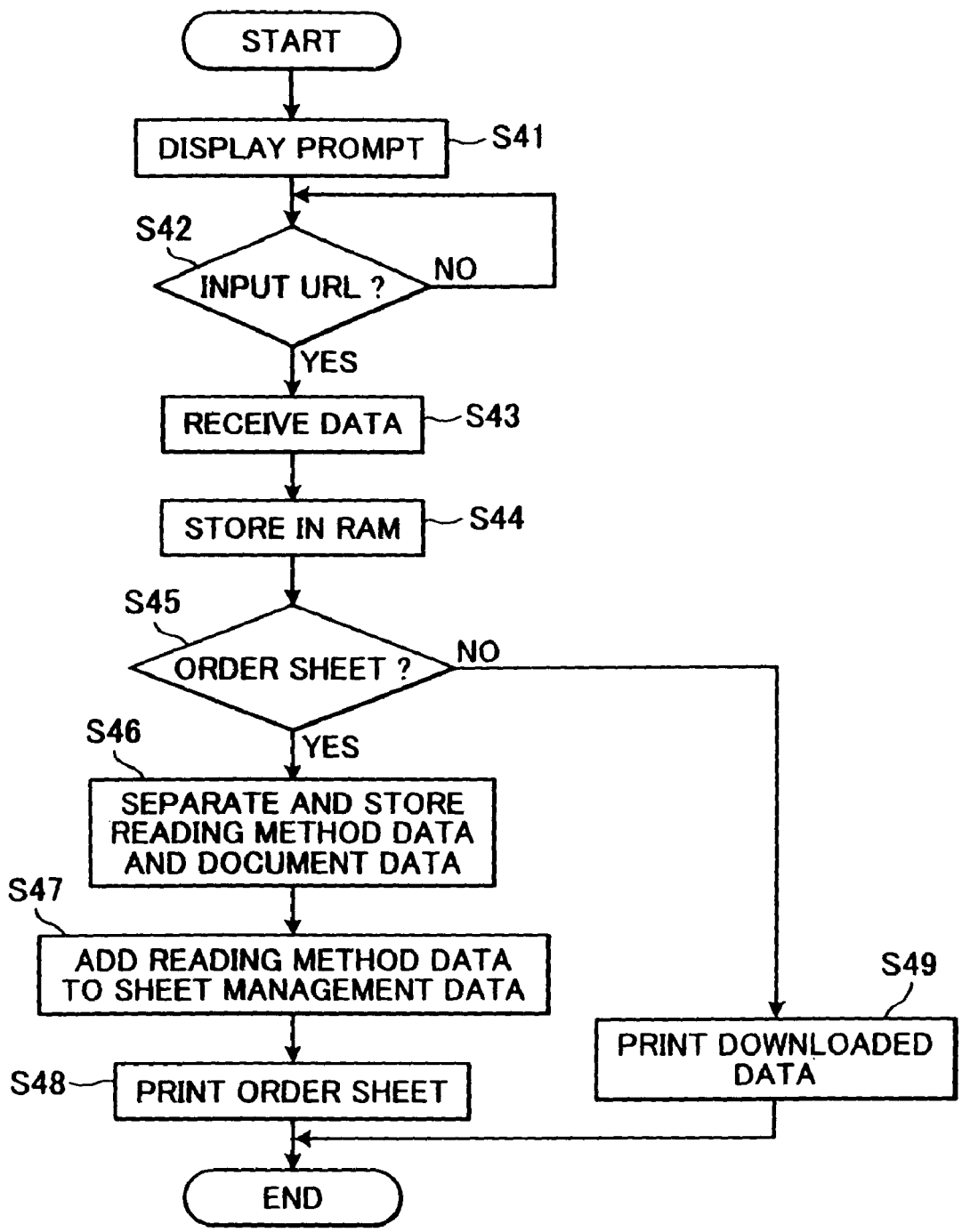
FIG. 15 is a flowchart representing a content acquire process according to the second embodiment of the present invention.

The content acquire process of FIG. 15 is started when a user 125 (FIG. 14) presses a Web Print key (not shown) provided on the operating panel 27. Because processes in S41-S45 and S49 are the same processes as in S1-S5 and S8 of FIG. 8, descriptions on these processes will be omitted. If it is determined in S45 that the downloaded data is data that includes document data and reading method data appended with sheet number data (S45:YES), then in S46, the CPU 111 retrieves the document data from the transmission/reception data storage unit 115B, and stores the same into the work memory 115A. Next in S47, the CPU 111 retrieves the reading method data appended with the sheet number data from the transmission/reception data storage unit 115B, and stores the same into the reading method database 115J of the RAM 115.

Subsequently, in S48, the CPU 111 outputs the document data stored in the work memory 115A to the recording unit 37 via the interface 93, so that the recording unit 37 prints out the document data based on a resolution and other recording settings stored in the record/display setting storage unit 115I so as to provide an order sheet. Then, the process ends.

With this process, the order sheet is printed out for the user 125, and the reading method data and the sheet number data for the order sheet is stored in the reading method database 115J.

Figure 16:
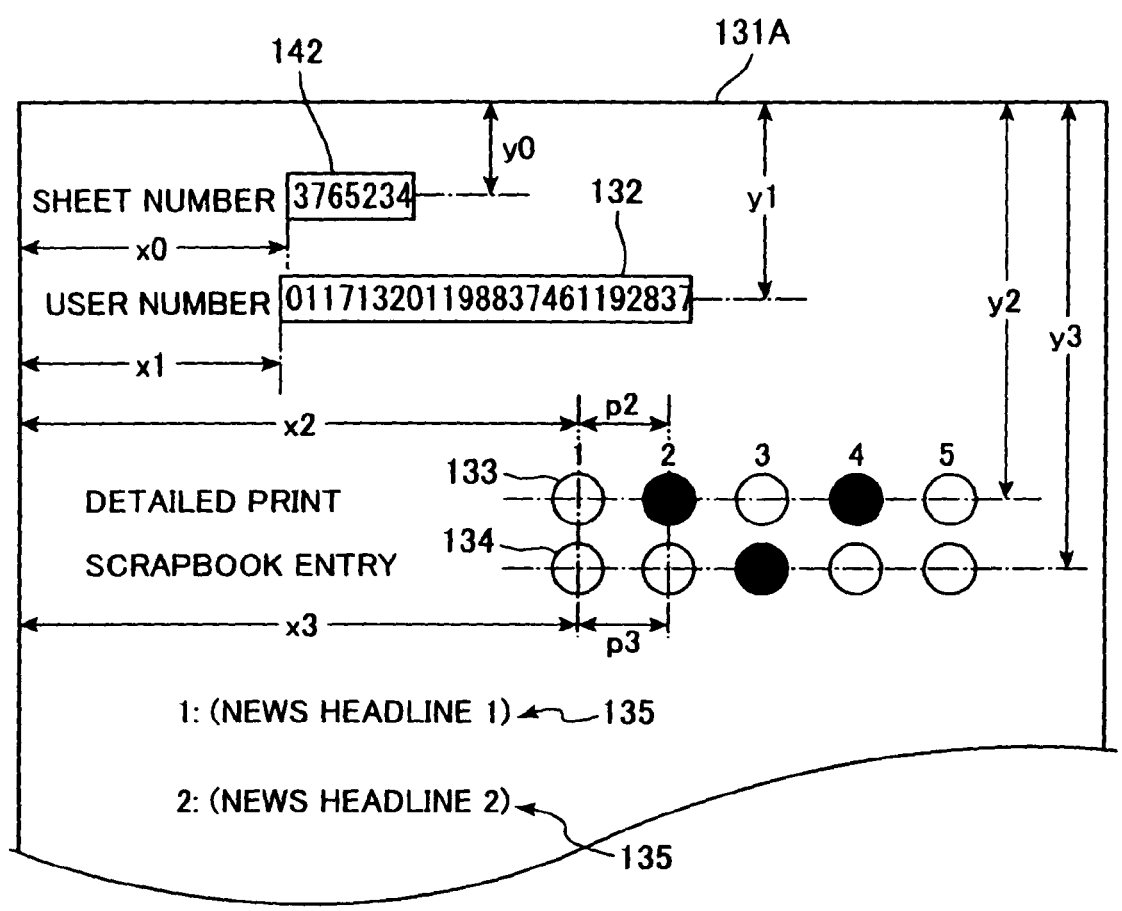
FIG. 16 is an explanatory diagram showing an example of order sheet according to the second embodiment of the present invention.

An example of the order sheet printed in S48 is shown in FIG. 16. The order sheet 131A of the present embodiment is similar to the order sheet 131 of the first embodiment shown in FIG. 9, but differs in that a sheet number 142 is printed at the top left of the order sheet 131A as shown in FIG. 16.

The sheet number 142 has a 7-digit number and is positioned a distance x0 from the left edge and a distance y0 from the top edge of the order sheet 131A. The sheet number 142 corresponds to the sheet number data appended to the reading method data.

In addition to the sheet number 142, the order sheet 131A is also printed with a user number 132, five unfilled circles 133 in a print data request specifying area, five unfilled circles 134 in a scrapbook entry request specifying area, and data names 135, which are the same as those of the order sheet 131, and detailed description thereof will be omitted.

Next, data structure of the reading method database 115J will be described with reference to FIG. 17. As shown in FIG. 17, the reading method database 115J stores a sheet management data 145 that includes a sheet number area and a method area. One or more of 7-digit sheet number is stored in the sheet number area as the sheet number data. In the example of FIG. 17, sheet numbers "3765234", "1823746", "9128374", and the like are stored in the sheet number area.

In the reading method area, a reading method data is stored in association with a corresponding sheet number. In the example of FIG. 17, three data entries to be read are stored as reading method data in the reading method area in association with the sheet number "3765234". This reading method data having the three data entries is the same as the above-described reading method data 141 shown in FIG. 10, so detailed description thereof will be omitted.

Figure 18:
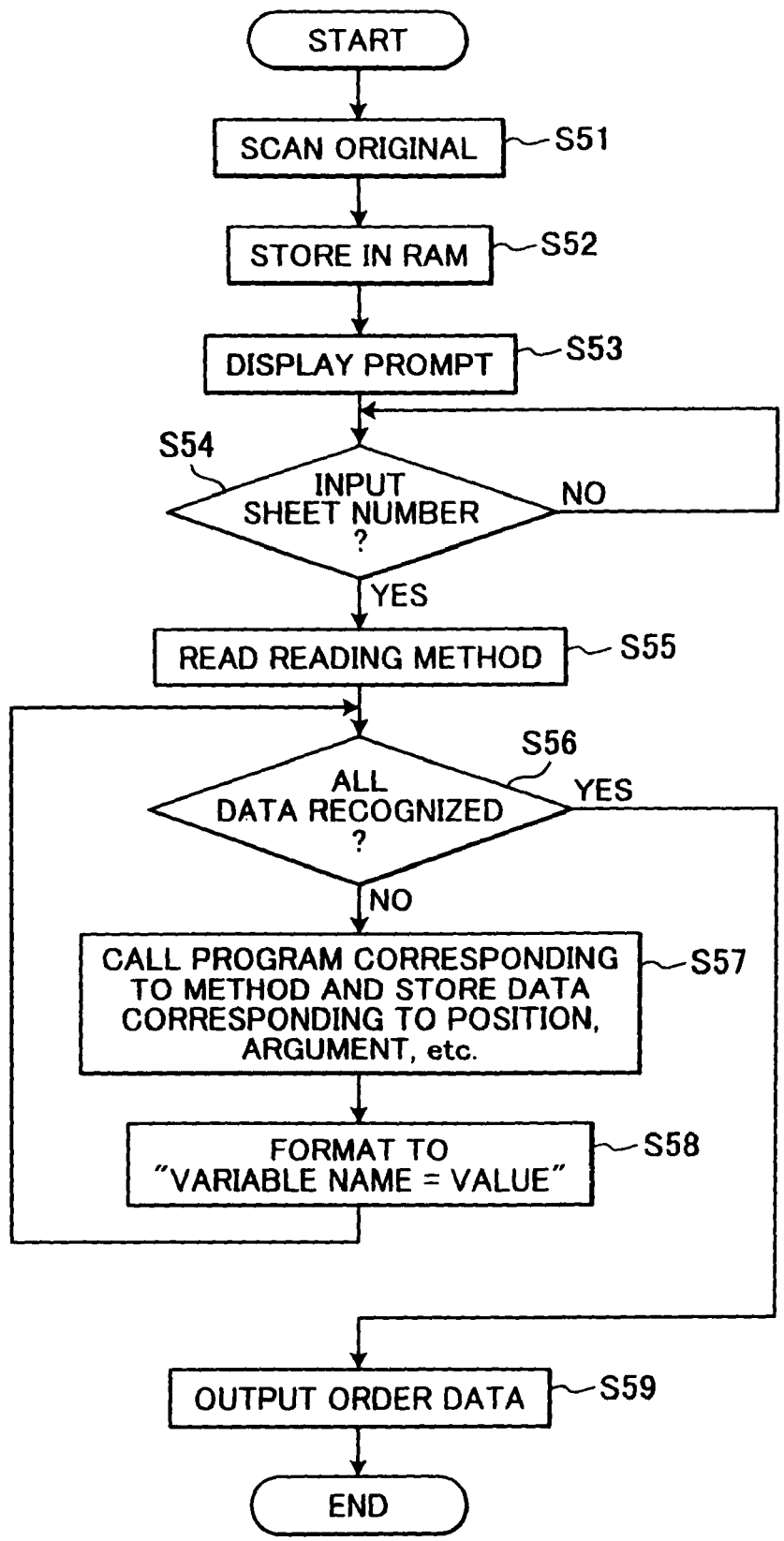
FIG. 18 is a flowchart representing an order process according to the second embodiment of the present invention.

Next, an order process according to the second embodiment will be described with reference to the flowchart of FIG. 18. The order process is started when the user 125 inserts the order sheet 131A, whose circles 133, 134 are filled in by the user 125 as desired, into the manual-feed second paper tray 31 of the facsimile device 1 and specifies a server program URL of the web server 21 in a well-known manner. When the order process starts, first in S51, the CPU 111 scans the order sheet 131A using the scanner 35 and obtains corresponding image data. In S52, the CPU 111 stores the image data into the RAM 115. Then, in S53, the CPU 111 displays an input prompt on the LCD 274 prompting the user to input the sheet number 142 printed on the order sheet 131A. The CPU 111 determines in S54 whether or not an input complete signal indicating that a 7-digit number (order sheet number 142) has been completed is received from the operating panel 27 via the interface 93, the router controller 101, the HUB 103, and the network interface 117. If not (S54:NO), then the process waits until the input complete signal is received.

If the input complete signal has been received (S54:YES), then in S55, the CPU 111 reads reading method data corresponding to the input sheet number 142 from the sheet management data 145 stored in the reading method database 115J, and stores the reading method data into the work memory 115A. In S56, the CPU 111 determines whether all data entries corresponding to the reading method data has been read.

Figure 11:
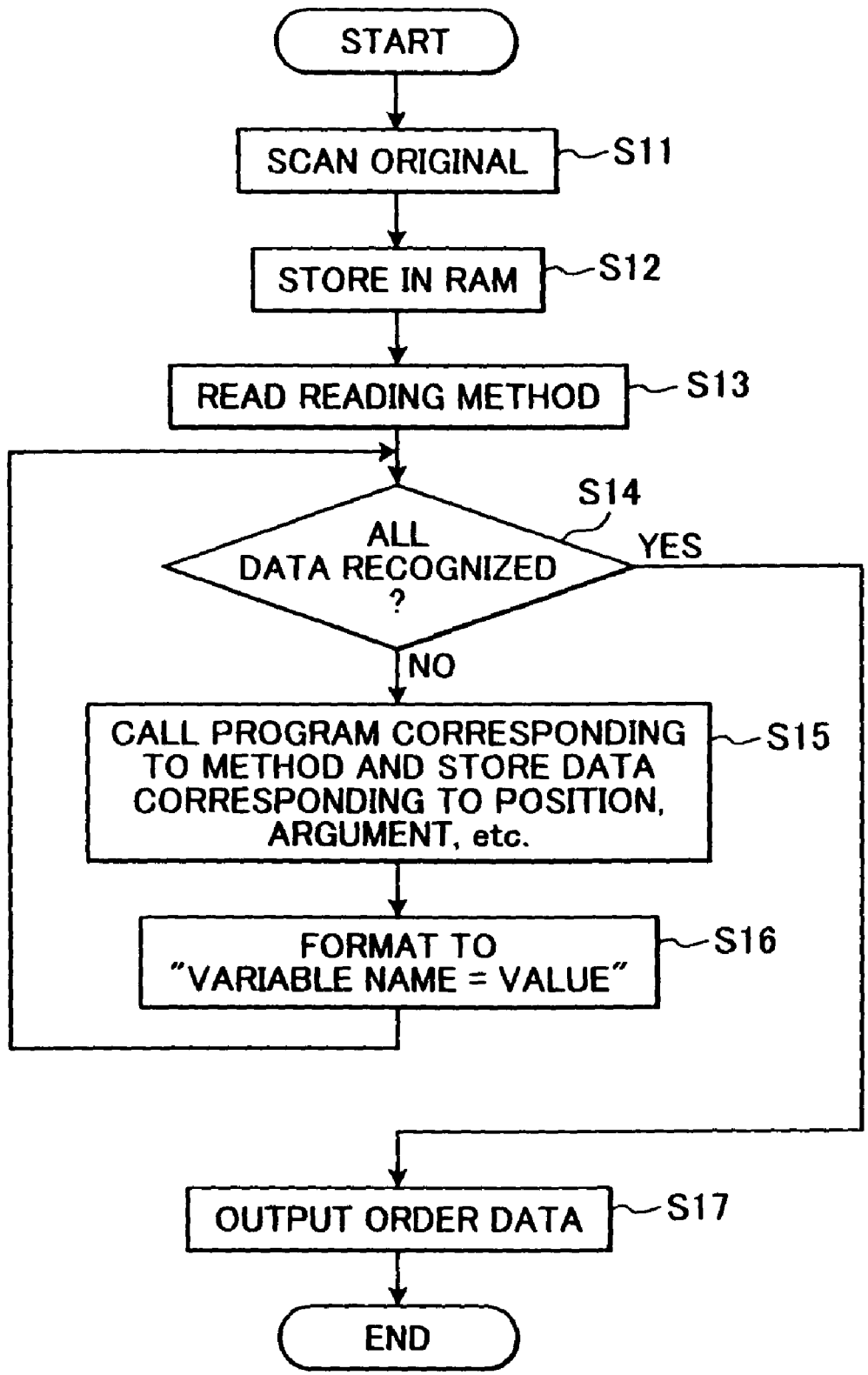
FIG. 11 is a flowchart representing an order process according to the first embodiment executed by the CPU in the web print unit of the facsimile device.

If not (S56:NO), then in S57, the CPU 111 executes the same process as in S15 of FIG. 11. That is, the CPU 111 reads a first data entry in the reading method data from the work memory 115A, reads relevant data from the image data according to a program corresponding to "method" of the first data entry, and stores the relevant data sequentially in the RAM 115. Next in S58, the CPU 111 executes the same process as in S16 of FIG. 11. That is, the CPU 111 converts data extracted from the RAM 115 to the format "variable name=value" and stores the formatted data in the RAM 115. Then, the process repeats until a positive determination is made in S56.

In the example of FIGS. 16 and 17, the sheet number 142 is "3765243", so "3765243" is input in S54, and the reading method data corresponding to "3765243" is retrieved in S55. "user" and the number sequence "011713201198837461192837" are read as the variable name and the user number, respectively, by the program "methoduserid.prg", and then stored in the RAM 115 in S57. Formatted data "user=011713201198837461192837" is stored in the RAM 115 as "variable name 1=value 1" in S58. Subsequently, "req_detail" and "01010" are read as the variable name and the binary data, respectively, by the program "method=bin_bit", and both are sequentially stored in the RAM 115 in S57. Formatted data "req_detail=01010" is stored in the RAM 115 as "variable name 2=value 2" in S58. Afterwards, "req_scrap" and "00100" as the variable name and binary data by the program "method=bin_bit", and stores the both in the RAM 115 in S57. Then, formatted data "req_scrap=00100" is stored in the RAM 115 as "variable name 3=value 3" in S58.

When, a positive determination is made in S56 (S56:YES), then the process proceeds to S59, where the CPU 111 executes the same process as in S17 of FIG. 11. That is, the CPU 111 reformats all data corresponding to the reading method data as "server program URL?variable name 1=value 1&variable name 2=value 2& . . . ", and transmits the same to the web server 21 as the order data, via the HUB 103, the router controller 101, the WAN connection port 6, the ADSL modem 9, and the like. If a URL indicating a server program of the web server 21 is "http://www.aaa.com/request", then in this example "http://www.aaa.com/request?user=011713201198837461192837&req_detail=01010&req?scrap=00100" is transmitted to the web server 21 as the order data. Then, the process ends.

Figure 12:
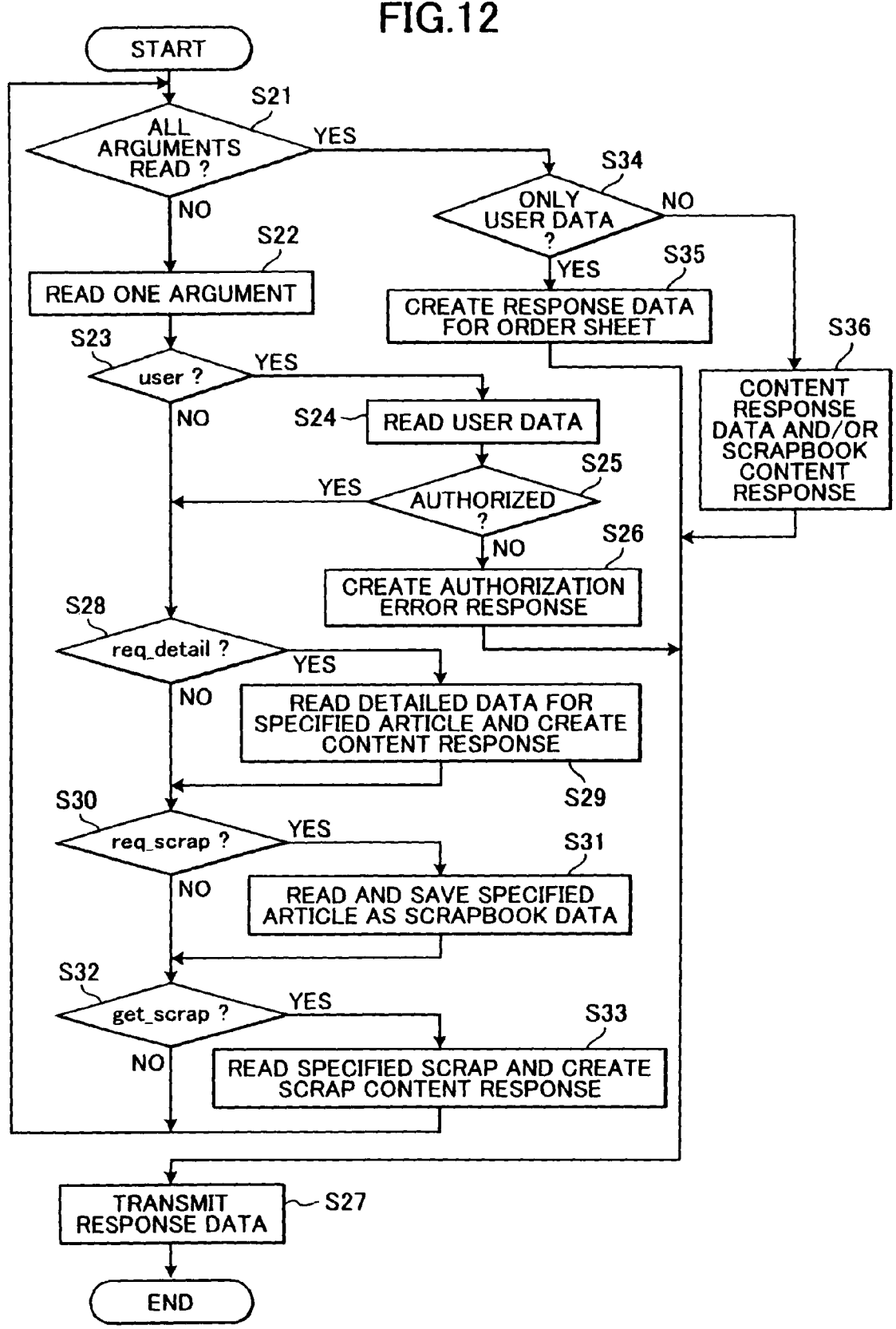
FIG. 12 is a flowchart representing a reception process executed by the web server.

Because a reception process of the present embodiment is the same as that of the first embodiment shown in FIG. 12, description thereof will be omitted.

According to the present embodiment, the same effects as that of the first embodiment can be provided. Also, the user 125 can simultaneously receive a plurality sets of document data and reading method data appended with sheet number data, and can acquire desired content by scanning each desired order sheet 131A and inputting a corresponding sheet number 142, thereby facilitating operations by the user 125. By keeping a plurality of types of order sheet 131A near at hand and manually inserting a desired order document 131A at any time thereafter into the second paper tray 31 to be scanned by the scanner 35, the user can acquire desired content, thereby further facilitating operations by the user 125.

Figure 19:
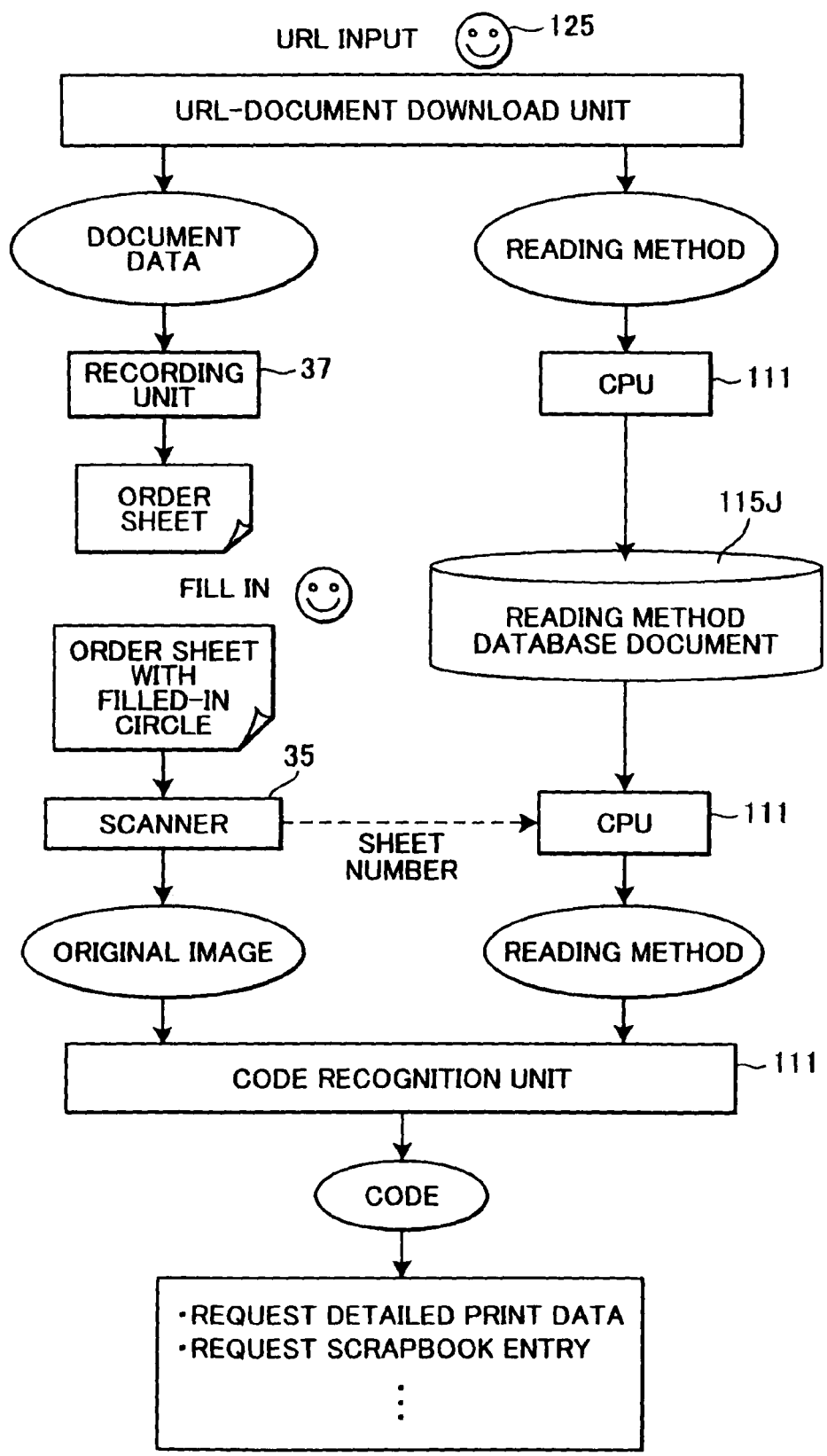
FIG. 19 is an explanatory diagram showing an order procedure according to a third embodiment of the present invention.

Next, an order procedure according to a third embodiment of the present invention will be described. FIG. 19 is an explanatory diagram showing the order procedure. The order procedure according to the third embodiment is similar to that of the second embodiment, except a sheet number 142 is automatically retrieved by the scanner 35 without requiring the user 125 to manually inputting the same in an order process.

Because a content acquire process, an order sheet, a data structure of the reading method database 115J, and a reception process of the present embodiment are the same as those of the second embodiment, description thereof will be omitted.

FIG. 20 shows a flowchart representing the order process of the present embodiment. The order process is started when the user 125 inserts the order sheet 131A, whose circles 133, 134 are filled in by the user 125 as desired, into the manual-feed second paper tray 31 of the facsimile device 1 and specifies a server program URL of the web server 21 in a well-known manner. When the order process starts, first in S61, the CPU 111 scans the order sheet 131A using the scanner 35 and obtains corresponding image data in the same manner as in S51. Next in S62, the CPU 111 retrieves a sheet number data from the image data according to a sheet number recognition program stored in the ROM 113. For example, the CPU 111 reads from the ROM 113 position coordinates (x0, y0) at which the sheet number 142 is located and data of "7-digits" indicating the number of digits in the number. The CPU 111 then reads data for the 7-digit number located at the position a distance x0 from the left edge and a distance y0 from the top edge of the order sheet 131A, recognizes this sheet number data as "3765234", and stores this number in the RAM 115.

In S63, the CPU 111 reads the sheet number data from the RAM 115 and reads the reading method data corresponding to the sheet number from the sheet management data 145 stored in the reading method database 115J, and stores the reading method data in the work memory 115A.

For example, the CPU 111 reads "3765234" as the sheet number data from the RAM 115, reads reading method data corresponding to the sheet number data "3765234" in the sheet management data 145, and stores the reading method data in the work memory 115A. Next, the processes of S54-S57 described in FIG. 18 are executed in S64-S67, and the process ends.

The third embodiment provides the same effects as that of the second embodiment. In addition, because the sheet number 142 is automatically retrieved by the scanner 35, the user 125 does not need to manually input the sheet number 142, thereby further facilitating operations by the user 125.

Here, the sheet number 142 may be configured as a barcode or the like, thereby improving the reading accuracy of the sheet number 142.

While some exemplary embodiments of this invention have been described in detail, those skilled in the art will recognize that there are many possible modifications and variations which may be made in these exemplary embodiments while yet retaining many of the novel features and advantages of the invention.

What is claimed is:

1. An image forming device comprising:
    a communication unit that communicates bi-directionally with a web server on the Internet, and that receives web data;
    a determining unit that determines whether or not the web data received by the communication unit is order-sheet data including both document data and reading method data, the document data indicating an image to be recorded and the reading method data including a coordinate position of a recording sheet where an order is to be recorded by a user on which the image is formed based on the document data received by the communication unit;
    an acquiring unit that separates and acquires the document data and the reading method data from the web data which is determined to be the order-sheet data by the determining unit;
    a memory that stores the reading method data separated and acquired by the acquiring unit;
    an image forming unit that forms the image on the recording sheet based on the web data received by the communication unit irrespective of whether or not the web data is determined to be the order-sheet data, the image forming unit, if the determining unit determines that the web data is the order-sheet data, providing an order sheet by forming the image on the recording sheet based on the document data which does not include the reading method data, the order sheet including a request specifying area enabling a user to record an order for predetermined data, the request specifying area being at the coordinate position indicated by the reading method data;
    a scanner that scans the order sheet to generate image data of the order sheet, the user having recorded the order in the request specifying area prior to scanning; and
    an order data creating unit that creates order data from the image data and the reading method data stored in the memory by determining a coordinate position of the recorded order based on the reading method data, by recognizing the recorded order based on the determined coordinate position, and by providing instructions for processing the recorded order, wherein
    the communication unit transmits the order data to the web server.

2. The image forming device according to claim 1, wherein the order data includes transmission request data, the transmission request data requesting the web server to transmit data content corresponding to the transmission request data to the communication unit, and the communication unit receives the data content which the web server has transmitted in response to the transmission request data.

3. The image forming device according to claim 1, wherein the order data includes temporary save request data, the temporary save request data requesting the web server to temporarily save data content corresponding to the temporary save request data, and the communication unit receives the data content which the web server has transmitted in response to the temporary save request data.

4. The image forming device according to claim 1, wherein the request specifying area of the order sheet is a mark in a prescribed format printed at a prescribed position of the order sheet.

5. The image forming device according to claim 1, wherein the order data is described by a URL.

6. The image forming device according to claim 1, further comprising a specify unit that specifies an identification data, wherein:
    the order-sheet data further includes identification data;
    the acquiring unit separates and acquires the document data, the reading method data, and the identification data from the order-sheet data;
    the memory stores a plurality of reading method data, each of the plurality of method data associated with a corresponding identification data; and
    the order data creating unit creates the order data from the image data based on the reading method data corresponding to the identification data specified by the specify unit.

7. The image forming device according to claim 1, wherein the reading method data defines a variable, indicates a location of the variable on the order sheet, and defines a process for assigning the variable a value.

8. The image forming device according to claim 6, wherein the order sheet is printed with identification data, and the specify unit specifies the identification data printed on the order sheet with reference to the image data of the order sheet.

9. An image forming device comprising:
    a communication unit that communicates bi-directionally with a web server on the Internet, and that receives web data;
    a controller that:
        determines whether or not the web data received by the communication unit is order-sheet data including both document data and reading method data, the document data indicating an image to be recorded and the reading method data including a coordinate position of a recording sheet where an order is to be recorded by a user on which the image is formed based on the document data received by the communication unit;
        separates and acquires the document data and the reading method data from the web data which is determined to be order-sheet data;
        stores the separated and acquired reading method data in a memory, the reading method data being stored separate from the document data; and
        creates an order sheet based on the document data which does not include the reading method data, if the web data received by the communication unit is determined to be the order-sheet data, the order sheet including a request specifying area enabling a user to record an order for predetermined data, the request specifying area being at the coordinate position indicated by the reading method data;
    a printer that forms the image on the recording sheet based on the web data received by the communication unit irrespective of whether or not the web data is determined to be the order-sheet data, the printer forming the order sheet by forming the image on the recording sheet; and
    a scanner that scans the order sheet to generate image data of the order sheet, the user having recorded the order in the request specifying area prior to scanning;

wherein:
  the controller creates order data from the image data and the reading method data stored in the memory by determining a coordinate position of the recorded order based on the reading method data, by recognizing the recorded order based on the determined coordinate position, and by providing instructions for processing the recorded order; and
  the communication unit transmits the order data to the web server.

10. The image forming device according to claim 9, wherein the reading method data defines a variable, indicates a location of the variable on the order sheet, and defines a process for assigning the variable a value.

11. The image forming device according to claim 9, wherein the order data is described by a URL.

* * * * *